United States Patent [19]

Gai

[11] Patent Number: 5,416,531
[45] Date of Patent: May 16, 1995

[54] BRIGHTNESS SIGNAL/COLOR SIGNAL SEPARATING FILTER INCLUDING IMAGE CORRECTION JUDGING CIRCUIT

[75] Inventor: Toshihiro Gai, Nagaokakyo, Japan

[73] Assignee: Mitsubishi Denki Kabushiki Kaisha, Tokyo, Japan

[21] Appl. No.: 228,572

[22] Filed: Apr. 15, 1994

Related U.S. Application Data

[60] Continuation of Ser. No. 83,872, Jun. 30, 1993, which is a continuation of Ser. No. 406, Jan. 4, 1993, which is a division of Ser. No. 825,785, Jan. 21, 1992, abandoned, which is a continuation of Ser. No. 729,470, Jul. 12, 1991, abandoned.

[30] Foreign Application Priority Data

Jul. 23, 1990 [JP] Japan ................. 2-197481
Jul. 23, 1990 [JP] Japan ................. 2-197482

[51] Int. Cl.$^6$ ........................... H04N 9/78
[52] U.S. Cl. ........................ 348/663; 348/664; 348/666
[58] Field of Search ........... 348/663, 665, 664, 666, 348/712, 713; 358/31, 21 R, 21 V, 37, 39, 40; H04N 9/78

[56] References Cited

U.S. PATENT DOCUMENTS

| | | | |
|---|---|---|---|
| 4,305,091 | 12/1981 | Cooper | 358/36 |
| 4,573,070 | 2/1986 | Cooper | 358/36 |
| 4,789,890 | 12/1988 | Itoh | 358/31 |
| 4,803,547 | 2/1989 | Stratton | 358/31 |
| 4,954,885 | 9/1990 | Itoh | 358/31 |
| 5,225,899 | 7/1993 | Park | 358/31 |

FOREIGN PATENT DOCUMENTS

| | | |
|---|---|---|
| 3526677A1 | 2/1986 | Germany . |
| 3528699A1 | 2/1986 | Germany . |
| 139090 | 7/1985 | Japan . |
| 226292 | 11/1985 | Japan . |
| 2241403 | 8/1991 | United Kingdom . |

OTHER PUBLICATIONS

"IDTV Receiver", *Consumer Electronics*, vol. CE-33, Aug. 1987, No. 3, pp. 181-191.
"NTSC Y/C Separation and Enhancement Technique with Two Dimensional Adaptive Features" to Itoga et al, *IEEE Transactions of Consumer Electronics*, vol. 34, No. 1, Feb. 1988 pp. 194-204.
"Digital TV Comb Filter with Adaptive Features" (Rossi, J. P.) IERE Conf. Proc. pp. 267-282 (1976).
"Digital Television Image Enhancement" (Rossi, J. P.) Journal of the SMPTE, vol. 84, Jul. (1975).
WPI Abstract Acc No 91-099021/14.
WPI Abstract Acc No 89-125082/17.
WPI Abstract Acc No 89-125081/17.

*Primary Examiner*—James J. Groody
*Assistant Examiner*—Sherrie Hsia

[57] ABSTRACT

A brightness signal/color signal separating filter. Non-correlative energies are extracted in various combinations of the horizontal scanning direction, the vertical scanning direction, a brightness signal and a color signal so as to judge the degree of video correlation in the horizontal direction and in the vertical direction.

8 Claims, 15 Drawing Sheets

BRIGHTNESS SIGNAL/COLOR SIGNAL SEPARATING FILTER INCLUDING IMAGE CORRECTION JUDGING CIRCUIT

This application is a continuation application of application Ser. No. 08/083,872 filed on Jun. 30, 1993, which is a continuation application of Ser. No. 08/000,406, filed Jan. 4, 1993, which is a Rule 60 Divisional of Ser. No. 07/825,785, filed Jan. 21, 1992, abandoned, which is a Rule 62 Continuation of Ser. No. 07/729,470, filed Jul. 12, 1991, now abandoned. The entire contents of the specification of Ser. Nos. 08/000,406, 07/825,785, and 07/729,470 are hereby incorporated by reference.

BACKGROUND OF THE INVENTION

1. Field of the Invention

The present invention relates to a brightness signal/color signal separating filter for separating a brightness signal and a color signal from a composite TV signal of, for example, an NTSC system.

2. Description of the Related Art

FIG. 12 is a block diagram of a conventional brightness signal/color signal separating filter of an NTSC system.

The operation of the conventional filter will be explained with reference to FIG. 12.

A composite color TV signal 5101 of an NTSC system input from an input terminal 5001 is converted into a digital signal 5201 by an A/D converter 5002 and supplied to a vertical filter 5006 for filtering signals in the vertical scanning direction (hereinunder referred to merely as "vertical direction") and a first 1-line delay circuit 5003.

The output 5202 of the first 1-line delay circuit 5003 is input to a second 1-line delay circuit 5004, a delay compensating circuit 5005 and the vertical filter 5006. The output 5203 further delayed by one line by the second 1-line delay circuit 5004 is input to the vertical filter 5006.

The vertical filter 5006 is generally composed of a filter which is called a 2-line comb filter, and the output of the vertical filter 5006 is input to a band-pass filter 5007.

The output 5205 of the band-pass filter 5007 is led out of an output terminal 5008 as a color signal and input to one input terminal of a subtracter 5009. The output 5206 of the delay compensating circuit 5005 is input to the other input terminal of the subtracter 5009. The delay compensating circuit 5005 is a circuit for compensating for the delay in the band-pass filter 5007. A brightness signal 5207 is output from the subtracter 5009 and led out of an output terminal 5010.

The operation of the conventional color filter with respect to a composite color TV of an NTSC system will now be explained.

The composite color TV signals 5201 which are synchronously sampled at a sampling frequency of $f_s = 4 \cdot f_{sc}$ ($f_{sc}$ represents a color subcarrier frequency) by the A/D converter 5002 are arranged two-dimensionally on a screen, as shown in FIG. 13.

Since $f_{sc} = (455/2)f_H$ ($f_H$ represents a horizontal scanning frequency), 4 samples of color signals C having a phase difference of 180° are extracted per period on each line.

In FIG. 13, the symbol Y represents a brightness signal, and C1 and C2 color signals. The blank circle is Y+C1, hatched circle is Y−C1, white triangle is Y+C2 and hatched triangle is Y−C2.

If the delay of 1 sample and the delay of one line are expressed by $Z^{-1}$ and $Z^{-l}$, respectively, by Z conversion, $$Z^{-1} = exp(-j2\pi f/4f_{sc}).$$

Since $f_{sc}32(455/2)f_H$, $l = 910$.

The vertical filter 5006 extracts a line support signal 5204 including a color signal C for supporting a line which includes a color signal from the current input signal, the 1-line delayed signal 5202 and the 2-line delayed signal 5203. In this case, the transfer function HV(Z) of the vertical filter 5006 is $$Hv(Z) = (-\tfrac{1}{4}) \cdot (1 - Z^{-l})^2.$$

In other words, the line support signal HC(m, n) 5204 at the coordinates (m, n) on the screen shown in FIG. 13 is extracted in the form of $$HC(m, n) = -(\tfrac{1}{4})\{S(m, n-1) - 2S(m, n) + S(m, n+1)\}.$$

The line support signal 5204 also includes a brightness signal Y. The band-pass filter 5007 separates the color signal C(m, n), which is a high-frequency component, from the line support signal HC(m, n) 5204. The thus-obtained color signal 5205 is supplied to the subtracter 5009. The subtracter 5009 subtracts the color signal C(m, n) 5205 from a signal S (m, n) 5206 obtained by delaying the 1-line delay signal 5202 by the delay compensating circuit 5005 in correspondence with the band-pass filter 5007, thereby separating the brightness signal Y(m, n) as represented by the following equation:

$$Y(m, n) = S(m, n) - C(m, n).$$

In this case, the transfer function Hh(Z) of the band-pass filter 5007 is constituted, for example, as represented by the following equation:

$$Hh(Z) = (-1/32)(1 - Z^{-2})^2 (1 + Z^{-4})^2 (1 + Z^{-8}).$$

As described above, in the conventional brightness signal/color signal separating filter, the characteristics of the vertical filter and a horizontal filter for filtering signals in the horizontal scanning direction (hereinunder referred to merely as "horizontal direction") are combined in a fixed state. In other words, the brightness signal Y and the color signal C are separated by the band-pass filter both in the vertical and horizontal scanning directions.

Therefore, in an area in which the brightness and the color of a picture rapidly change, each of the brightness signal Y and the color signal C leaks out to the other's channel, which produces a deterioration in quality of the reproduced picture due to dot interference or the like.

SUMMARY OF THE INVENTION

Accordingly, it is an object of the present invention to eliminate the above-described problems in the related art and to provide a brightness signal/color signal separating filter which is capable of accurately separating a brightness signal and a color signal even if a rapid change is produced in a TV signal.

To achieve this aim, the present inventor has introduced the conception of non-correlative energy. The non-correlative energy is the value showing the degree of non-correlation between a certain coding series and another coding series. Accordingly, when the non-correlative energy is large, the correlation is low, while when the non-correlative energy is small, the correlation is high.

In other words, it is possible to know a video correlation by using the non-correlative energy. The video correlation refers to a correlation between a plurality of samples which constitute a picture. Therefore, if the non-correlative energy is obtained in the vertical direction, it is possible to evaluate the video correlation in the vertical direction. If the non-correlative energy is obtained in the horizontal direction, it is possible to evaluate the video correlation in the horizontal direction. If the non-correlative energy is obtained with respect to both a color signal and a brightness signal, such an evaluation is possible on both the color signal and the brightness signal.

In the present invention, such an evaluation on the video correlation and the selection of a color signal in accordance with the result of the evaluation are adopted as the fundamental technique for achieving the object of the present invention. That is, the present applicant proposes a technique for selecting a color signal which is extracted in the direction in which the video correlation is the highest and outputting the selected color signal as the separated color signal. For example, when the video correlation in the vertical direction is high and the video correlation in the horizontal direction is low, the color signal extracted in the vertical direction is adopted.

To state this more explicitly, the present invention provides an improved brightness signal/color signal separating filter for executing such a technique. This brightness signal/color signal separating filter ensures the separation of a brightness signal and a color signal in a screen area in which the picture rapidly changes, for example, in the vertical direction, and prevents the leakage of a brightness signal to a color signal, or vice versa, thereby reducing what is called dot interference.

The structure of the present invention will now be explained. The present invention can have many kinds of structure, as will be described hereinunder.

One such structure of the brightness signal/color signal separating filter comprises:
  delay means for delaying a composite video signal which is sampled at a frequency synchronous with a horizontal scanning frequency and extracting sample values at an object sampling point and at least two reference sampling points;
  extracting filter means for extracting and outputting at least first and second signals based on the sample values, said first signal including color subcarrier frequency components in a first direction, said second signal including color subcarrier frequency components in a second direction, said first and second directions being non-parallel;
  selection means for selecting one of at least said first signal and said second signal as a separated color signal in accordance with a selection signal;
  video correlation judging means for outputting said selection signal to control said selecting means;
  brightness extraction means using said separated color signal and said composite video signal to produce a separated brightness signal; and wherein said video correlation judging means includes,
  horizontal brightness signal non-correlative energy extracting means for extracting, based on said sample values, a horizontal brightness signal non-correlative energy which indicates the degree of non-correlativity of a brightness signal in a horizontal scanning direction;
  horizontal color signal non-correlative energy extracting means for extracting, based on said sample values, at least one horizontal color signal non-correlative energy which indicates the degree of non-correlativity of a color signal in the horizontal scanning direction;
  vertical brightness signal non-correlative energy extracting means for extracting, based on said sample values, a vertical brightness signal non-correlative energy which indicates the degree of non-correlativity of the brightness signal in a vertical scanning direction;
  vertical color signal non-correlative energy extracting means for extracting, based on said sample values, at least one vertical color signal non-correlative of energy which indicates the degree of non-correlativity of the color signal in the vertical scanning direction;
  first generating means for generating at least one first vertical quasi-comparative signal for judging that vertical non-correlation is at least a predetermined degree greater than horizontal non-correlation from said horizontal brightness signal non-correlative energy, said horizontal color signal non-correlative energy, and one of said vertical brightness signal non-correlative energy and said vertical color signal non-correlative energy;
  second generating means for generating an intermediate quasi-comparative signal from said horizontal brightness signal non-correlative energy, said horizontal color signal non-correlative energy and said vertical brightness signal non-correlative energy, said second generating means generating at least one delayed intermediate quasi-comparative signal, and generating at least one second vertical quasi-comparative signal for judging that the vertical non-correlation is at least the predetermined degree greater than the horizontal non-correlation when said intermediate quasi-comparative signal and said delayed intermediate quasi-comparative signal are coincident, at least one of said intermediate quasi-comparative signal and said delayed intermediate quasi-comparative signal representing said object sample point; and
  judging means for generating said selection signal to select one of at least said first and second signal based on said first vertical quasi-comparative signal and said second vertical quasi-comparative signal.

In this structure, the delay circuit includes, first delay means for delaying said composite video signal by a predetermined number of lines and outputting the delayed signal as a first delayed composite video signal, and
second delay means for delaying said first delayed composite video signal by the same number of lines as said first delay means and outputting the delayed signal as a second delayed composite video signal; and
said extracting filter means includes,
horizontal color signal extracting filter means for extracting said first signal including a color subcarrier frequency component in the horizontal scanning direction on the basis of three sampled values in the horizontal scanning direction and outputting the extracted signal as the first signal, said three sampled values in the horizontal scanning direction being the sample value at said object sampling point, the sample value at a first reference sampling point and the sample value at a second reference sampling point, said first reference sampling point being one of a plurality of sampling points which constitute said first delayed composite video signal and being situated a predetermined number of sampling points to the left of said object sampling point on a screen, and said second reference sampling point being one of the plurality of sampling points which constitute said first delayed composite video signal and being situated said predetermined number of sampling points to the right of said object sampling point on the screen in bilateral symmetry with said first reference sampling point with respect to said object sampling point, and horizontal/vertical color signal extracting filter means for extracting said second signal including a color subcarrier frequency component in the vertical scanning direction and in the horizontal scanning direction on the basis of five sample values and outputting said second signal, said five sample values being the sample value at said object sampling point, the sample value at said first reference sampling point, the sample value at said second reference sampling point, a sample value at a third reference sampling point and a sample value at a fourth reference sampling point, said third reference sampling point being one of a plurality of sampling points which constitute said composite video signal and being situated said predetermined number of lines, which corresponds to the delay of said first delay means, above said object sampling point on the screen, and said fourth reference sampling point being one of a plurality of sampling points which constitute said second delayed composite video signal and being situated said predetermined number of lines, which corresponds to the delay of said second delay means, below said object sampling point on the screen.

The fundamental structure common to four other kinds of brightness signal/color signal separating filters will first be briefly explained.

The fundamental structure has the following circuits:
A) a first delay circuit;
B) a second delay circuit;
C) a vertical color signal extracting filter;
D) a horizontal color signal extracting filter;
E) a horizontal/vertical color signal extracting filter;
F) a switching circuit;
G) a video correlation judging circuit and
H) a first subtracter.

The first delay circuit first delays a composite video signal by a predetermined number of lines and outputs the delayed signal as a first delayed composite video signal. It is here assumed that the composite video signal has already been sampled at a frequency which is synchronous with a horizontal scanning frequency. The delay (number of lines) is one line in the NTSC system and 2 lines in the PAL system.

The second delay circuit then delays the first delayed composite video signal by the same number of lines as the first delay circuit and outputs the delayed signal as a second delayed composite video signal. Therefore, in the present invention, three kinds of signals, namely, the composite video signal, the first delayed composite video signal and the second delayed composite video signal are obtained. These signals are serially delayed by a predetermined number of lines with respect to each other.

Accordingly, if any given point is selected from the plurality of sampling points which constitute the first delay composite video signal as an object sampling point, it is possible to extract a color signal by using the sampled values at the object sampling point and sampling points in the vicinity thereof. In the present invention, a first reference sampling point, a second reference sampling point, a third reference sampling point and a fourth reference sampling point are adopted as the sampling points for extracting a color signal. These sampling points are determined in correlation with the object sampling point.

The first reference sampling point is one of the plurality of sampling points which constitute the composite video signal and is situated a predetermined number of lines, which corresponds to the delay of the first delay circuit, above the object sampling point on the screen. On the other hand, the second reference sampling point is situated a predetermined number of lines, which corresponds to the delay of the second delay circuit, below the object sampling point. Therefore, the second reference sampling point is one of the plurality of sampling points which constitute the second delayed composite video signal. The third reference sampling point is one of the plurality of sampling points which constitute the first delayed composite video signal like the object sampling point, but it is situated a predetermined number of sampling points to the right of the object sampling point on the screen. On the other hand, the fourth reference sampling point is situated a predetermined number of sampling points to the left of the object sampling point on the screen. The fourth reference sampling point is naturally one of the plurality of sampling points which constitute the first delayed composite video signal.

The vertical color signal extracting filter extracts and outputs a signal including a color subcarrier frequency component in the vertical direction on the basis of the three sampled values of the object reference sampling point, the first reference sampling point and the second reference sampling points, respectively. The extracted signal will be referred to as a "first color signal" hereinunder. Since the sampled value of the object sampling point and the sampled values of the points situated above and below the object sampling point are used by the filter, the first color signal can be said to be a signal which can be selected when the video correlation in the vertical direction is sufficiently high.

The horizontal color signal extracting filter extracts a signal including a color subcarrier frequency component in the horizontal direction on the basis of three sampled values and outputs the extracted signal as a second color signal. The sampling points used by this filter are the object reference sampling point, the third reference sampling point and the fourth reference sampling point. The second color signal can therefore be said to be a signal which can be selected when the video correlation in the horizontal direction is sufficiently high.

The horizontal/vertical color signal extracting filter extracts a signal including a color subcarrier frequency component in the vertical and horizontal directions on the basis of five sampled values and outputs the extracted signal as a third color signal. The sampling points used by this filter are the object sampling point, the first reference sampling point, the second reference sampling point, the third reference sampling point and the fourth reference sampling point. The third color signal extracted by this filter is a signal which is selected when the video correlation both in the horizontal direction and in the vertical direction is low.

The switching circuit selectively outputs one of these color signals, namely, either the first color signal, the second color signal or the third color signal. In order to discriminate the color signal output from the switching circuit from the other color signals, the former color signal will be referred to as a "separated color signal" hereinunder. The switching control of the switching circuit is carried out by a video correlation judging circuit. The video correlation judging circuit so controls the switching circuit as to select one of the first color signal, the second color signal or the third color signal as the separated color signal. The thus-obtained color signal is subtracted from the first delayed composite video signal by the first subtracter and the result is output as a separated brightness signal.

In this way, the present invention has a structure for selecting a color signal. What is important in the present invention is by what technique or by what structure a color signal is selected. As described above, the first color signal must be selected when the video correlation in the vertical direction is sufficiently high, the second color signal when the video correlation in the horizontal direction is sufficiently high, and the third color signal when the video correlation both in the horizontal direction and in the vertical direction is low. Such a selection is carried out by the video correlation judging circuit on the basis of the extraction of the non-correlative energy. Described above, the present invention can have other four structures depending upon the kind of structure of the video correlation judging circuit.

A first structure of the video correlation judging circuit will first be explained. The first structure of the video correlation judging circuit has the following elements:

a) a horizontal brightness signal non-correlative energy extracting circuit;
b) a horizontal color signal non-correlative energy extracting circuit;
c) a vertical brightness signal non-correlative energy extracting circuit;
d) a vertical color signal non-correlative energy extracting circuit;
e) first to eighth multipliers;
f) first to fourth maximum value calculators;
g) ninth to eleventh multipliers;
h) first to third comparator; and
i) a judging circuit.

The horizontal brightness signal non-correlative energy extracting circuit extracts a horizontal brightness signal non-correlative energy DYH which shows the degree of non-correlativity of a brightness signal in the horizontal direction. The horizontal color signal non-correlative energy extracting circuit extracts a horizontal color signal non-correlative energy DCH which shows the degree of non-correlativity of a color signal in the horizontal direction. The vertical brightness signal non-correlative energy extracting circuit extracts a vertical brightness signal non-correlative energy DYV which shows the degree of non-correlativity of a brightness signal in the vertical direction. The vertical color signal non-correlative energy extracting circuit extracts a vertical color signal non-correlative energy DCV which shows the degree of non-correlativity of a color signal in the vertical direction.

Each of the thus-obtained non-correlative energies is input to one or more of the first to eighth multipliers and, after some processing, to the second and third comparators.

The first multiplier multiplies the horizontal brightness signal non-correlative energy DYH by a constant a and outputs the product. The second multiplier multiplies the horizontal color signal non-correlative energy DCH by a constant b and outputs the product. The third multiplier multiplies the horizontal brightness signal non-correlative energy DYH by a constant e1 and outputs the product. The fourth multiplier multiplies the horizontal color signal non-correlative energy DCH by a constant f1 and outputs the product. The fifth multiplier multiplies the horizontal brightness signal non-correlative energy DYH by a constant e2 and outputs the product. The sixth multiplier multiplies the horizontal color signal non-correlative energy DCH by a constant f2 and outputs the product. The seventh multiplier multiplies the vertical brightness signal non-correlative energy DYV by a constant c and outputs the product. The eighth multiplier multiplies the vertical color signal non-correlative energy DCV by a constant d and outputs the product.

The thus-obtained outputs are input to one of the first to fourth maximum value calculators. The first maximum value calculator compares the output of the first multiplier with the output of the second multiplier and the larger value is output as a first horizontal non-correlative energy DH1. The second maximum value calculator compares the output of the third multiplier with the output of the fourth multiplier and the larger value is output as a second horizontal non-correlative energy DH21. The third maximum value calculator compares the output of the fifth multiplier with the output of the sixth multiplier and the larger value is output as a third horizontal non-correlative energy DH22. The fourth maximum value calculator compares the output of the seventh multiplier with the output of the eighth multiplier and the larger value is output as a vertical non-correlative energy DV.

The thus-obtained non-correlative energies DH1, DH21, DH22 and DV are represented by the following equations:

$$DH1 = max\ (a \cdot DYH,\ b \cdot DCH)$$

$$DH21 = max\ (e1 \cdot DYH,\ f1 \cdot DCH)$$

$$DH22 = max\ (e2 \cdot DYH,\ f2 \cdot DCH)$$

$$DV = max\ (c \cdot DYV,\ d \cdot DCV)$$

The ninth multiplier multiplies the output of the second maximum value calculator by a constant m1 and outputs the product. The tenth multiplier multiplies the output of the third maximum value calculator by a constant m2 and outputs the product. The eleventh multiplier multiplies the output of the fourth maximum value calculator by a constant n and outputs the product.

The thus-obtained values are supplied to one of the first to third comparators. The first comparator compares DH1 with n·DV. If DH1>n·DV, the first comparator judges that the video correlation in the vertical direction is high and that in the horizontal direction is low in the vicinity of the object sampling point. On the other hand, if DH1<n·DV, the first comparator judges that the video correlation in the horizontal direction is low in the vicinity of the object sampling point.

The second comparator compares DCV with m1·DH21. If DCV>m1·DH21, the second comparator judges that the video correlation in the horizontal direction is high and that in the vertical direction is low in the vicinity of the object sampling point. On the other hand, if DCV<m1·DH21, the second comparator judges that the video correlation in the horizontal direction is low in the vicinity of the object sampling point.

The third comparator compares DYV with m2·DH22. If DYV>m2·DH22, the third comparator judges that the video correlation in the horizontal direction is high and that in the vertical direction is low in the vicinity of the object sampling point. On the other hand, if DYV<m2·DH22, the third comparator judges that the video correlation in the horizontal direction is low in the vicinity of the object sampling point.

The judging circuit controls the switching circuit on the basis of the results of the comparisons by the first to second comparators.

If all the conditions described below are satisfied, the first color signal is selected:
1) that the first comparator judges that the video correlation in the vertical direction is high and that in the horizontal direction it is low in the vicinity of the object sampling point,
2) that the second comparator judges that the video correlation in the horizontal direction is low in the vicinity of the object sampling point and
3) that the third comparator judges that the video correlation in the horizontal direction is low in the vicinity of the object sampling point.

That is, if all these three conditions are satisfied, since it is regarded that the video correlation in the horizontal direction is low and the video correlation in the vertical direction is high, the judging circuit commands the switching circuit to select the first color signal which is a color signal in the vertical direction.

If either of the conditions described below are satisfied, the second color signal is selected:
1) that the second comparator judges that the video correlation in the horizontal direction is high and that in the vertical direction it is low in the vicinity of the object sampling point, or
2) that the third comparator judges that the video correlation in the horizontal direction is high and that in the vertical direction it is low in the vicinity of the object sampling point.

That is, if either of these conditions are satisfied, since it is regarded that the video correlation in the vertical direction is low and the video correlation in the horizontal direction is high, the judging circuit commands the switching circuit to select the second color signal.

If all the conditions described below are satisfied, the third color signal is selected:
1) that the first comparator judges that the video correlation in the vertical direction is low in the vicinity of the object sampling point,
2) that the second comparator judges that the video correlation in the horizontal direction is low in the vicinity of the object sampling point and
3) that the third comparator judges that the video correlation in the horizontal direction is low in the vicinity of the object sampling point.

That is, if all these three conditions are satisfied, since it is regarded that the video correlation both in the horizontal direction and in the vertical direction is low, the judging circuit commands the switching circuit to select the third color signal which is a color signal extracted with due consideration into both the horizontal direction and the vertical direction.

A second structure of the video correlation circuit is different from the first structure in that the horizontal color signal non-correlative energy extracting circuit in the first structure is separated into a first horizontal color signal non-correlative energy extracting circuit and a second horizontal color signal non-correlative energy extracting circuit, in that the vertical color signal non-correlative energy extracting circuit in the first structure is separated into a first vertical color signal non-correlative energy extracting circuit and a second vertical color signal non-correlative energy extracting circuit, and in that the objects of processing by the circuits at the subsequent stages are different from those in the first structure.

The first horizontal color signal non-correlative energy extracting circuit first extracts a first horizontal color signal non-correlative energy DCH1 which shows the degree of non-correlativity of a color signal in the horizontal direction from the composite video signal, the first delayed composite video signal and the second delayed composite video signal. Separately from this, the second horizontal color signal non-correlative energy extracting circuit extracts a second horizontal color signal non-correlative energy DCH2 which shows the degree of non-correlativity of a color signal in the horizontal direction from the first delayed composite video signal.

The first vertical color signal non-correlative energy extracting circuit extracts a first vertical color signal non-correlative energy DCV1 which shows the degree of non-correlativity of a color signal in the vertical direction from the composite video signal, the first delayed composite video signal and the second delayed composite video signal. The second vertical color signal non-correlative energy extracting circuit extracts a second vertical color signal non-correlative energy DCV2 which shows the degree of non-correlativity of a color signal in the vertical direction from the composite video signal and the second delayed composite video signal.

In correspondence with these extracted signals, the object of calculation by the second multiplier is the first horizontal color signal non-correlative energy DCH1, the object of calculation by the fourth multiplier is the second horizontal color signal non-correlative energy DCH2, the object of calculation by the sixth multiplier is the second horizontal color signal non-correlative energy DCH2, and the object of calculation by the eighth multiplier is the second vertical color signal non-correlative energy DCV2. The objects of comparison by the second comparator are DCV1 and m1·DH21.

The video correlation judging circuit having the second structure has a similar operation to that of the video correlation judging circuit having the first structure.

A third structure of the video correlation circuit is obtained by adding a correlation coincidence judging means to the first structure. The correlation coincidence judging means judges whether or not the result of comparison by the third comparator is coincident at at least three sampling points, namely, the object sampling point, the sampling point a predetermined number of sampling points precedent to the object sampling point and the sampling point a predetermined number of sampling points after the object sampling point. For example, the output of the third comparator is delayed by a predetermined number (e.g., 1) of samples twice, and coincidence of the undelayed output, the output delayed once and the output delayed twice is judged by an AND circuit. The judging conditions for the judging circuit include the coincidence of the three video correlations in addition to the result of comparison by the third comparator.

According to the third structure, it is possible to obtain a picture with a further improved resolution in the horizontal direction.

A fourth structure of the video correlation circuit is obtained by adding the correlation coincidence judging means to the second structure. This structure has a similar operation to that of the third structure.

The structure of each of the non-correlative energy extracting circuits used in the present invention will now be explained.

The horizontal brightness signal non-correlative energy extracting circuit preferably has the following elements:

a) a vertical low pass filter;
b) a third delay circuit;
c) a fourth delay circuit;
d) a second subtracter;
e) a third subtracter;
f) a first absolute value calculator;
g) a second absolute value calculator; and
h) a fifth maximum value calculator.

Among these elements, the vertical low pass filter compounds the composite video signal, the first delayed composite video signal and the second delayed composite video signal and outputs the thus-obtained compound signal with the color subcarrier frequent component eliminated therefrom. The output signal substantially includes a brightness signal.

The third delay circuit delays the output of the vertical low pass filter by a predetermined number of sampling points and outputs the delayed signal. The fourth delay circuit delays the output of the third delay circuit by the same number of sampling points as the third delay circuit, and outputs the delayed signal. In this way, a first signal which is output from the vertical low pass filter and which includes a brightness signal, a second signal obtained by delaying the first signal by a predetermined number of sampling points and a third signal obtained by further delaying the second signal by the same number of simpling points are obtained. If the sampling point represented by the second signal is assumed to be the reference point, the sampling point represented by the first signal is a point horizontally shifted from the reference point by the corresponding number of sampling points in the horizontal direction on the screen and the sampling represented by the third signal is a point bilaterally symmetric with the point represented by the first signal with respect to the sampling point represented by the second signal.

The second subtracter outputs the difference between the output of the vertical low pass filter and the output of the first delay circuit. The third subtracter outputs the difference between the output of the third delay circuit and the output of the fourth delay circuit. Therefore, the output of the second delay circuit represents the difference between the brightness at the sampling point represented by the first signal and the brightness at the sampling point represented by the second signal, and the output of the third delay circuit represents the difference between the brightness at the sampling point represented by the second signal and the brightness at the sampling point represented by the third signal.

The first absolute value calculator outputs the absolute value of the output of the second subtracter. The second absolute value calculator outputs the absolute value of the output of the third subtracter. The fifth maximum value calculator compares the output of the first absolute value calculator with the output of the second absolute value calculator. Since these values represent the degrees of non-correlation, if the larger value is selected, it can be treated as a non-correlative energy. A brightness signal is here treated in the horizontal direction, the selected value corresponds to the horizontal brightness signal non-correlative energy DYH.

In this way, it is possible to extract the horizontal brightness signal non-correlative energy DYH by a simple structure.

The horizontal color signal non-correlative energy extracting circuit preferably has the following elements:

a) a fifth delay circuit;
b) a fourth subtracter; and
c) a third absolute value calculator.

The fifth delay circuit delays the output of the first delayed composite video signal by a predetermined number of sampling points and outputs the delayed signal. The fourth subtracter outputs the difference between the outputs of the first delayed composite video signal and the output of the fifth delay circuit. The third absolute value calculator outputs the absolute value of the output of the fourth subtracter as the horizontal color signal non-correlative energy DCH.

By delaying the first delayed composite video signal by a predetermined number of sampling points, it is possible to obtain a signal representing the position which is shifted from the position represented by the first delayed composite video signal by the same number of sampling points in the horizontal direction on the screen. Therefore, by the operation of the fourth subtracter, it is possible to obtain the difference between the sampled value of a sampling point and the sampled value of a sampling point which is shifted by a predetermined number of sampling points. For example, in the NTSC system, if the delay of the fifth delay circuit is assumed to be two samples, the color signal output from the fourth delay circuit shows the value including only the difference in the color signal component with the brightness signal component eliminated therefrom. It is therefore possible to treat the output of the third absolute value calculator as the horizontal color signal non-correlative energy DCH.

In this way, it is possible to extract the horizontal color signal non-correlative energy DCH by a simple structure.

The vertical brightness signal non-correlative energy extracting circuit preferably has the following elements:

a) first to third horizontal low pass filters;
b) fifth and sixth subtracters;
c) fourth and fifth absolute value calculators; and
d) a sixth maximum value calculator.

The first horizontal low pass filter eliminates the color subcarrier frequency component from the composite video signal. The second horizontal low pass filter eliminates the color subcarrier frequency component from the first delayed composite video signal. The third horizontal low pass filter eliminates the color subcarrier frequency component from the second delayed composite video signal. By these operations, it is possible to "obtain a signal substantially representing a brightness signal component.

The fifth subtracter outputs the difference between the output of the first horizontal low pass filter and the output of the second horizontal low pass filter. The sixth subtracter outputs the difference between the output of the second horizontal low pass filter and the output of the third horizontal low pass filter. The fourth absolute value calculator outputs the absolute value of the output of the fifth subtracter. The fifth absolute value calculator outputs the absolute value of the output of the sixth subtracter. The sixth maximum value calculator compares the output of the fourth absolute value calculator with the output of the fifth absolute value calculator and outputs the larger value as the vertical brightness signal non-correlative energy DYV.

In this way, it is possible to extract the vertical brightness signal non-correlative energy DYV by a simple structure.

The vertical color signal non-correlative energy extracting circuit preferably has the following elements:
a) first and second horizontal band-pass filters;
b) a seventh subtracter; and
c) a sixth absolute value calculator.

The first horizontal band-pass filter transmits and outputs the color subcarrier frequency component of the composite video signal. The second horizontal band-pass filter transmits and outputs the color subcarrier frequency component of the second delayed composite video signal. The seventh subtracter outputs the difference between the output of the first horizontal band-pass filter and the output of the second horizontal band-pass filter. The sixth absolute value calculator outputs the absolute value of the output of the seventh subtracter as the vertical color signal non-correlative energy DCV.

In this way, it is possible to extract the vertical color signal non-correlative energy DCV by a simple structure.

A brightness signal/color signal separating filter according to the present invention is also preferably provide with a color signal delay compensating means and a brightness signal delay compensating means. The color signal delay compensating means is a means for compensating for the time difference between the outputs of the vertical color signal extracting filter, the horizontal color signal extracting filter and the horizontal/vertical color signal extracting filter. The brightness signal delay compensating means is a means for compensating for the time difference between the separated color signal and the separated brightness signal by delaying the first delayed composite signal in correspondence with the time difference between the first delayed composite signal and the separated color signal. These means can be simply constituted by delay circuits and it is possible to prevent the deleterious influence of the delay on the processing of each circuit.

The correlation coincidence judging means preferably has the following structure.

The output of the first comparator is first delayed by a predetermined number of sampling points by a sixth delay circuit. Similarly, the output of the second comparator is delayed by the same number of sampling points as the sixth delay circuit by a seventh delay circuit. Further, the output of the third comparator is delayed by the same number of sampling points as the sixth delay circuit by an eighth delay circuit. In this way, the first to third color signals are delayed by the same number of sampling points with respect to each other.

The output of the eighth delay circuit is further delayed by the same number of sampling points as the sixth delay circuit by a ninth delay circuit. As a result, the third color signal, the signal obtained by delaying the third color signal by a predetermined number of sampling points by the eighth delay circuit and a signal obtained by delaying a predetermined number of sampling points by the eighth and ninth delay circuits are obtained. These three are signals for the sampling points which are serially shifted from each other by a predetermined number of sampling points.

These three signals are subjected to judgement. Whether or not these three signals are coincident is judged and the result is supplied to the judging circuit.

In this way, the correlation coincidence judging means can constitute only delaying means and logic elements.

The above and other objects, features and advantages of the present invention will become clear from the following description of preferred embodiments thereof, taken in conjunction with the accompanying drawings.

DESCRIPTION OF THE PREFERRED EMBODIMENT

Embodiments of the present invention will be explained with reference to the accompanying drawings.

Figure 1:
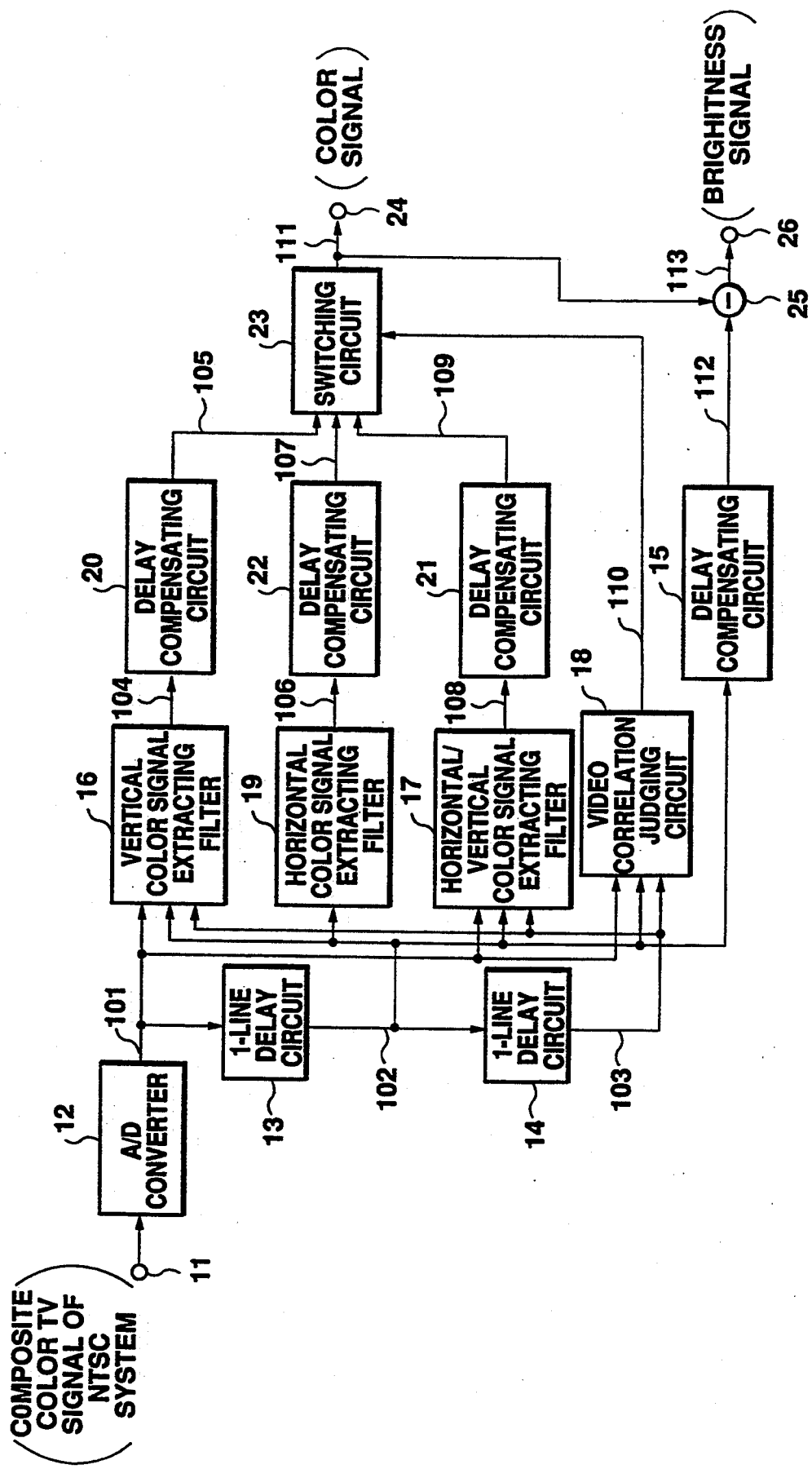
FIG. 1 is a block diagram of the structure of a first embodiment of a brightness signal/color signal separating filter according to the present invention.

FIG. 1 is a schematic block diagram of a first embodiment of a brightness signal/color signal separating filter according to the present invention. In FIG. 1, an input terminal 11 fetches a composite color TV signal of an NTSC system. An A/D converter 12 converts an analog composite color TV signal input from the input terminal 11 into a digital signal. A first 1-line delay circuit 13 has as its input the output signal from the A/D converter 12 and delays the input signal by one line. A second 1-line delay circuit 14 further delays the output of the first 1-line delay circuit 13 by one line. This embodiment is further provided with a delay compensating circuit 15, a vertical color signal extracting filter 16, a horizontal/vertical color signal extracting filter 17, a video correlation judging circuit 18, a horizontal color signal extracting filter 19, delay compensating circuits 20, 21, 22, a switching circuit 23, an output terminal 24 on the side of the switching circuit 23, a subtracter 25 and an output terminal 26 on the side of the subtracter 25.

Figure 2:
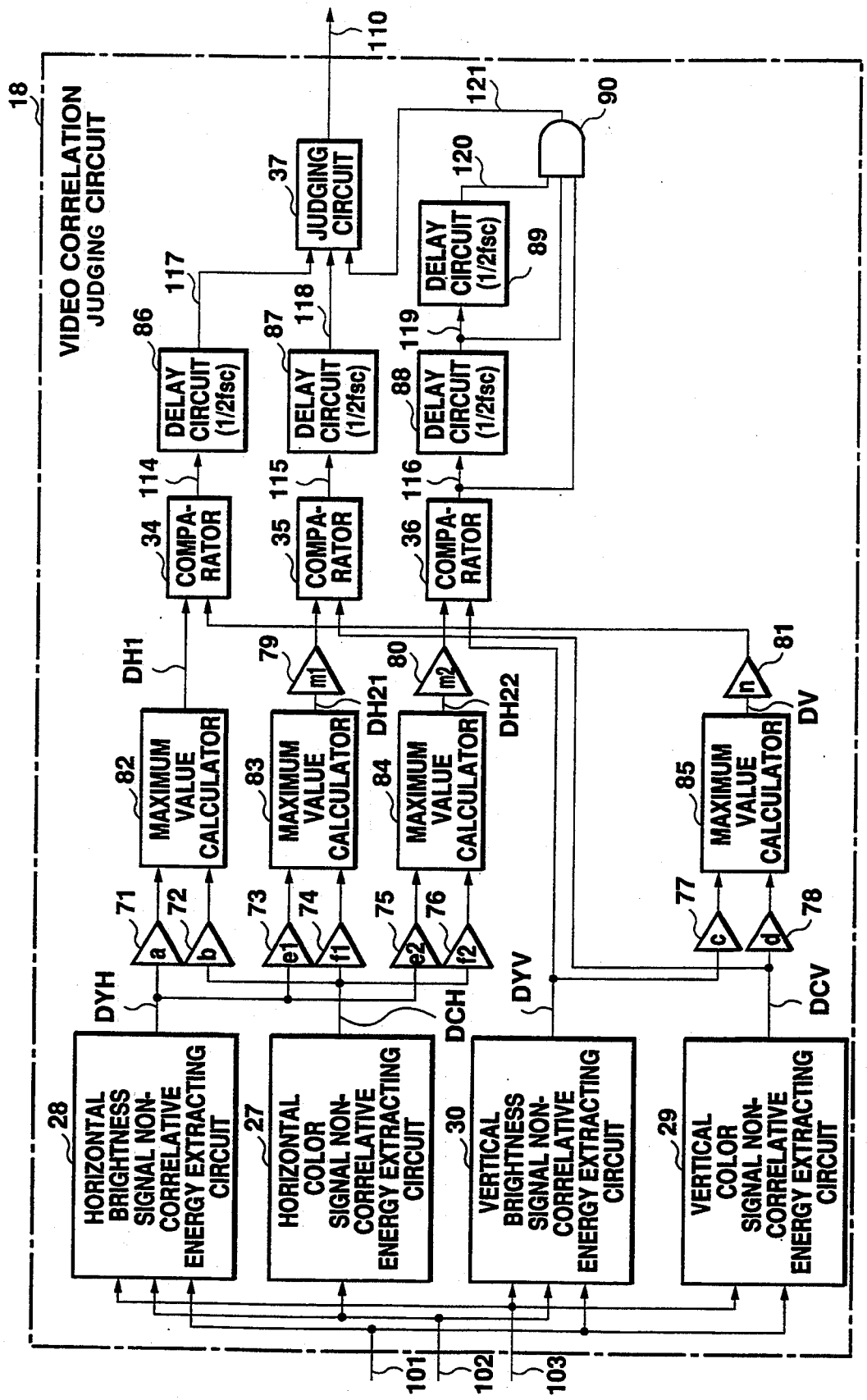
FIG. 2 is a block diagram of the structure of a video correlation judging circuit in the first embodiment.

FIG. 2 is a block diagram of an example of the video correlation judging circuit 18 shown in FIG. 1. The video correlation judging circuit 18 includes a horizontal color signal non-correlative energy extracting circuit 27, a horizontal brightness signal non-correlative energy extracting circuit 28, a vertical color signal non-correlative energy extracting circuit 29, a vertical brightness signal non-correlative energy extracting circuit 30, comparators 34, 35, 36, a judging circuit 37, multipliers 71 to 81, maximum value calculators 82 to 85, delay circuits 86 to 89 and an AND circuit 90.

The output signal 101 from the A/D converter 12 shown in FIG. 1 is supplied to the horizontal brightness signal non-correlative energy extracting circuit 28, the vertical color signal non-correlative energy extracting circuit 29, and the vertical brightness signal non-correlative energy extracting circuit 30 shown in FIG. 2. The output signal 102 from the first 1-line delay circuit 13 is supplied to the horizontal color signal non-correlative energy extracting circuit 27, the horizontal brightness signal non-correlative energy extracting circuit 28 and the vertical brightness signal non-correlative energy extracting circuit 30. The output signal 103 from the second 1-line delay circuit 14 is supplied to the horizontal brightness signal non-correlative energy extracting circuit 28, the vertical color signal non-correlative energy extracting circuit 29, and the vertical brightness signal non-correlative energy extracting circuit 30.

The output signal DCH from the the horizontal color signal non-correlative energy extracting circuit 27 is supplied in three directions. In a first direction, the output signal DCH is multiplied by a constant b by the multiplier 72 and the product is supplied to the maximum value calculator 82. In a second direction, the output signal DCH is multiplied by a constant f1 by the multiplier 74 and the product is supplied to the maximum value calculator 83. In a third direction, the output signal DCH is multiplied by a constant f2 by the multiplier 76 and the product is supplied to the maximum value calculator 84.

The output signal DYH from the horizontal brightness signal non-correlative energy extracting circuit 28 is supplied in three directions. In a first direction, the output signal DYH is multiplied by a constant a by the multiplier 71 and the product is supplied to the maximum value calculator 82. In a second direction, the output signal DYH is multiplied by a constant e1 by the multiplier 73 and the product is supplied to the maximum value calculator 83. In a third direction, the output signal DYH is multiplied by a constant e2 by the multiplier 75 and the product is supplied to the maximum value calculator 84.

The output signal DCV from the the vertical color signal non-correlative energy extracting circuit 29 is supplied in two directions. In one direction, the output signal DCV is supplied to the comparator 35 and in the other direction, the output signal DCV is multiplied by a constant d by the multiplier 78 and the product is supplied to the maximum value calculator 85.

The output signal DYV from the the vertical brightness signal non-correlative energy extracting circuit 30 is supplied in two directions. In one direction, the output signal DYV is supplied to the comparator 36 and in the other direction, the output signal DYV is multiplied by a constant c by the multiplier 77 and the product is supplied to the maximum value calculator 85.

The output signal from the maximum value calculator 82 is supplied to the comparator 34 as a first horizontal non-correlative energy DH1. The output signal from the maximum value calculator 83 is multiplied as a second horizontal non-correlative energy DH21 by a constant m1 by the multiplier 79 and the product is supplied to the comparator 35. The output signal from the maximum value calculator 84 is multiplied as a third horizontal non-correlative energy DH22 by a constant m2 by the multiplier 80 and the product is supplied to the comparator 36. The output signal from the maximum value calculator 85 is multiplied as a vertical non-correlative energy DV by a constant n by the multiplier 81 and the product is supplied to the comparator 34.

The comparator 34 compares the first horizontal non-correlative energy DH1 with n·DV which is obtained by multiplying the vertical non-correlative energy DV by the constant n. If DH1 ≧ n·DV, a signal 114 is output at a high level, otherwise, it is output at a low level.

The comparator 35 compares m1·DH21 which is obtained by multiplying the second non-correlative energy DH21 by the constant m1 with the vertical color signal non-correlative energy DCV. If DCV ≧ m1·DH21, a signal 115 is output at a high level, otherwise, it is output at a low level.

The comparator 36 compares m2·DH22 which is obtained by multiplying the third non-correlative energy DH22 by the constant m2 with the vertical brightness signal non-correlative energy DYV. If DYV ≧ m2·DH22, a signal 116 is output at a high level, otherwise, it is output at a low level.

The output signal 114 from the comparator 34 is supplied to the delay circuit 86, the output signal 115 from the comparator 35 is supplied to the delay circuit 87 and the output signal 116 from the comparator 36 is supplied to the delay circuit 88 and the AND circuit 90. The output signal 119 from the delay circuit 88 is supplied to the delay circuit 89 and the AND circuit 90, and the output signal 120 from the delay circuit 89 is supplied to the AND circuit 90. The output signal 117 from the delay circuit 86, the output signal 118 from the delay circuit 87 and the output signal 121 from the AND circuit 90 are supplied to the judging circuit 37.

The output signal 110 from the judging circuit 37 is supplied as the output of the video correlation judging circuit 18.

Figure 3:
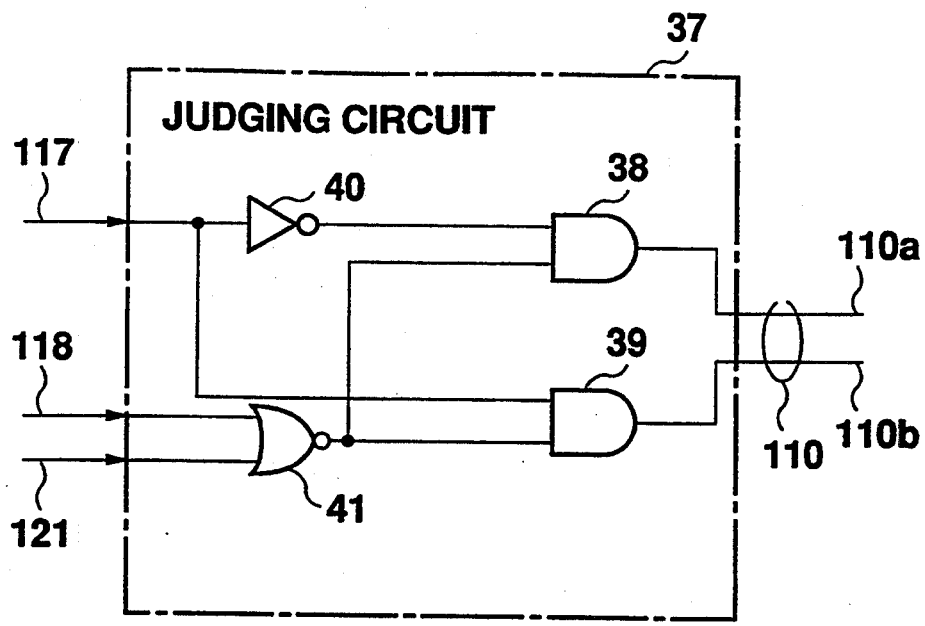
FIG. 3 is a block diagram of the structure of a judging circuit in the first embodiment.

FIG. 3 is a block diagram of an example of the judging circuit 37 shown in FIG. 2. The judging circuit 37 is composed of AND circuits 38, 39, a NOT circuit 40 and a NOR circuit 41. The output signal 117 from the delay circuit 86 is supplied to one input terminal of the AND circuit 39 and the input terminal of the NOT circuit 40. The output signal 118 from the delay circuit 87 is supplied to one input terminal of the NOR circuit 41. The output signal 121 from the AND circuit 90 is supplied to the other input terminal of the NOR circuit 41. The output of the NOR circuit 41 is supplied to the other input terminal of the AND circuit 39 and one input terminal of the AND circuit 38. The output terminal from the NOT circuit 40 is supplied to the other input terminal of the AND circuit 38.

The output signal from the AND circuit 38 and the output signal from the AND circuit 39 constitute the output signal 110 from the video correlation judging circuit 18.

Figure 4:
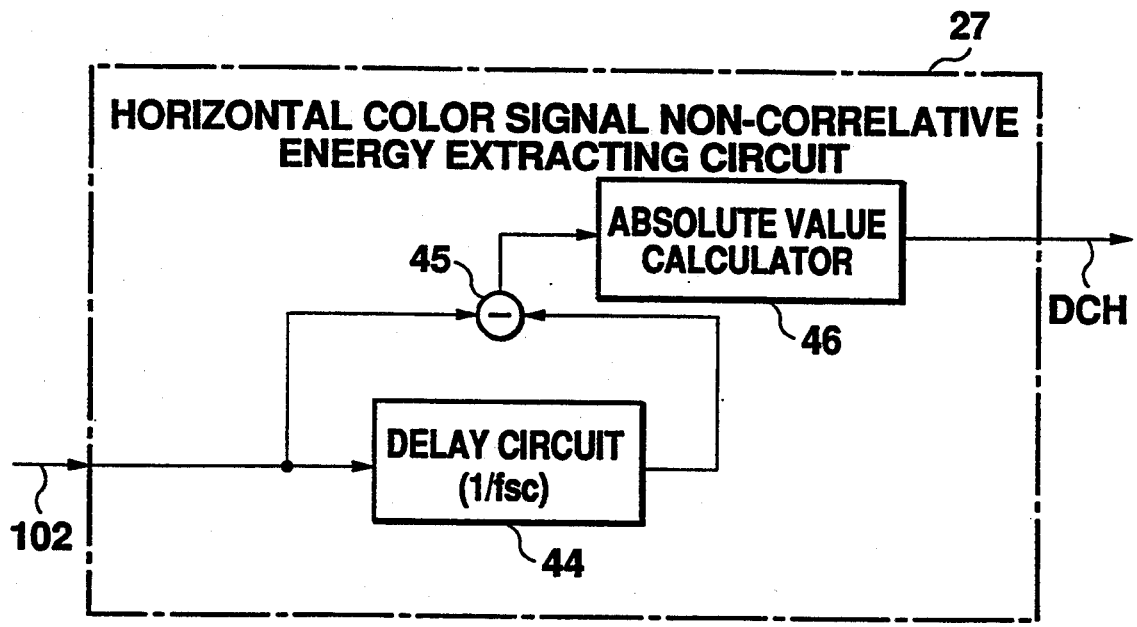
FIG. 4 is a block diagram of the structure of a horizontal color signal non-correlative energy extracting circuit in the first embodiment.

FIG. 4 is a block diagram of an example of the horizontal color signal non-correlative energy extracting circuit 27 shown in FIG. 2. This circuit 27 is composed of a delay circuit 44 which has a delay corresponding to one period of the color subcarrier ($1/f_{sc}$), a subtracter 45 and an absolute value calculator 46. The output signal 102 from the first 1-line delay circuit 13 is supplied to the delay circuit 44 and one input terminal of the subtracter 45. The output signal from the delay circuit 44 is supplied to the other input terminal of the subtracter 45. The output signal from the subtracter 45 is supplied to the absolute value calculator 46 and the output of the absolute value calculator 46 constitutes the horizontal color signal non-correlative energy DCH.

Figure 5:
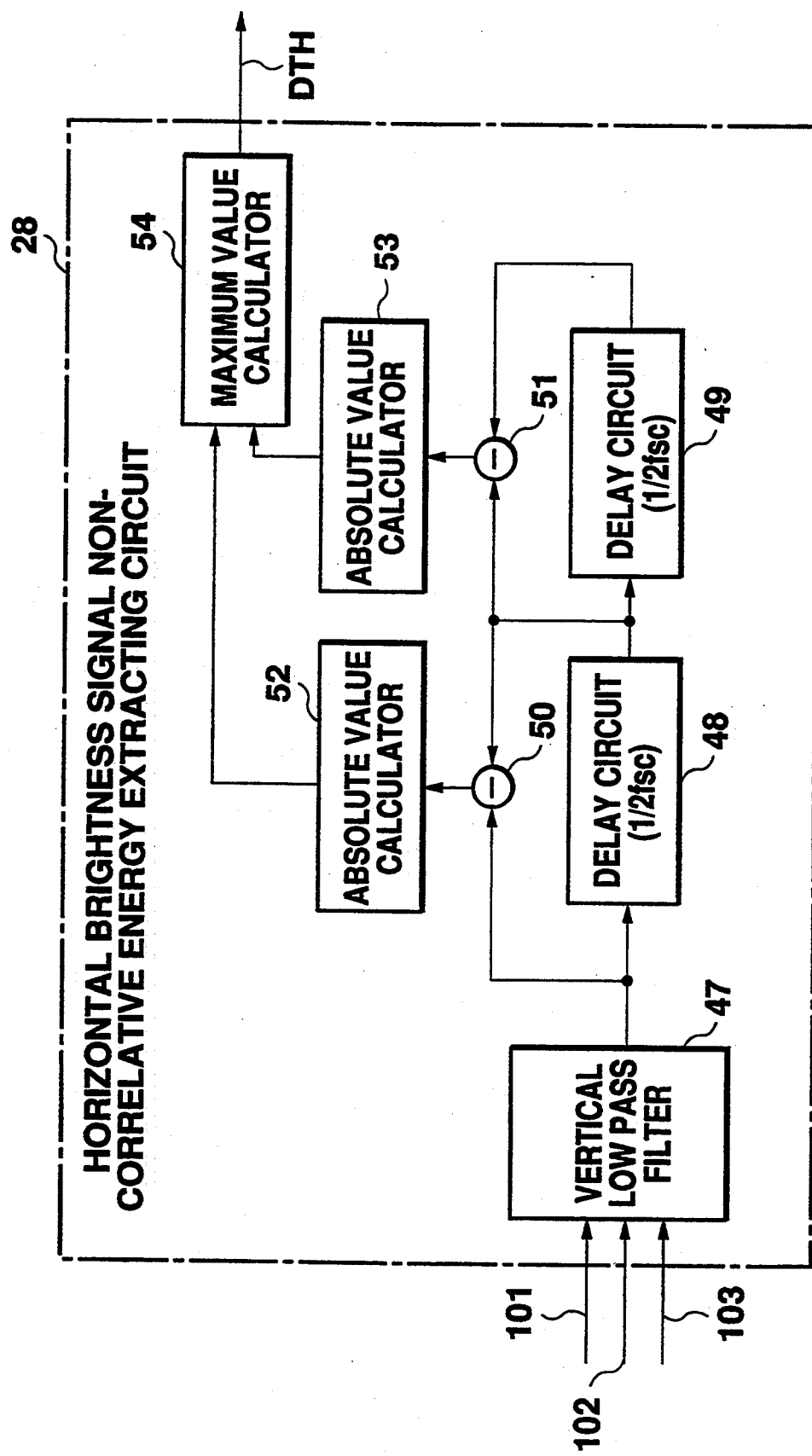
FIG. 5 is a block diagram of the structure of a horizontal brightness signal non-correlative energy extracting circuit in the first embodiment.

FIG. 5 is a block diagram of an example of the horizontal brightness signal non-correlative energy extracting circuit 28 shown in FIG. 2. This circuit 28 is composed of a vertical low pass filter 47, delay circuits 48, 49 each of which has a delay corresponding to one half period of the color subcarrier ($\frac{1}{2}f_{sc}$), subtracters 50, 51, absolute value calculators 52, 53 and a maximum value calculator 54. The output signal 101 from the A/D converter 12, the output signal 102 from the first 1-line delay circuit 13 and the output signal 103 from the second 1-line delay circuit 14 are supplied to the vertical low pass filter 47, and the output of the vertical low pass filter 47 is supplied to the delay circuit 48 and one input terminal of the subtracter 50. The output of the delay circuit 48 is supplied to the delay circuit 49, the other input terminal of the subtracter 50 and one input terminal of the subtracter 51. The output of the subtracter 50 is supplied to the absolute value calculator 52 and the output of the absolute value calculator 52 is in turn supplied to the maximum value calculator 54. The output of the subtracter 51 is supplied to the absolute value calculator 53 and the output of the absolute value calculator 53 is supplied to the maximum value calculator 54. The output of the maximum value calculator 54 constitutes the output DYH of the horizontal brightness signal non-correlative energy extracting circuit 28.

Figure 6:
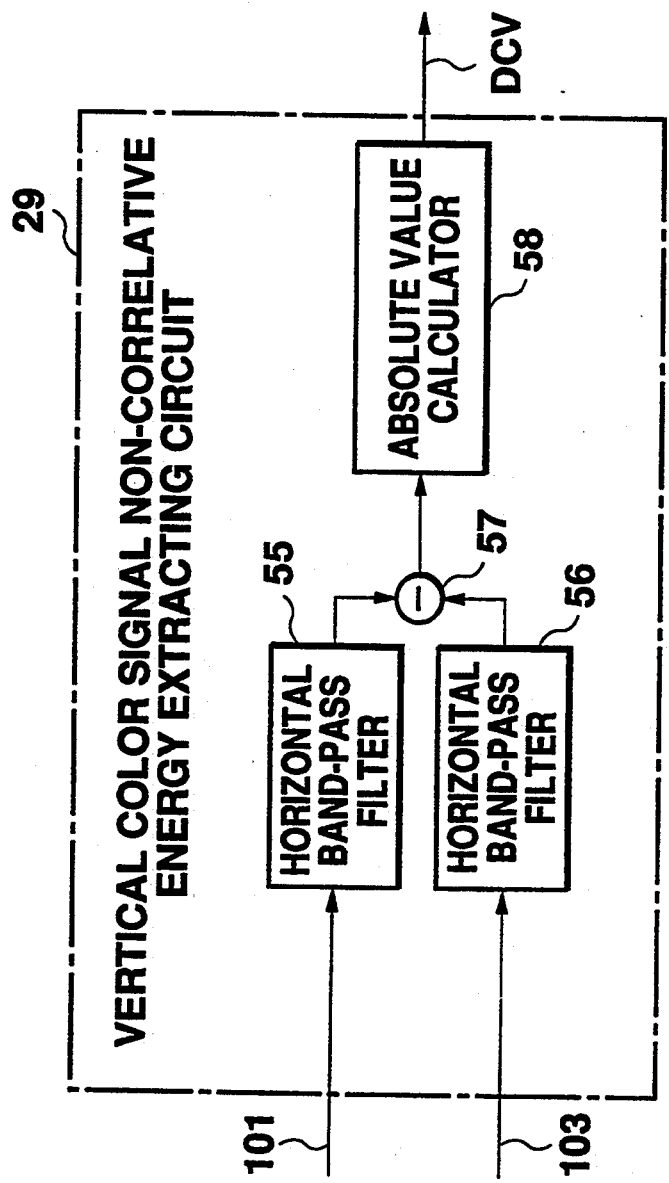
FIG. 6 is a block diagram of the structure of a vertical color signal non-correlative energy extracting circuit in the first embodiment.

FIG. 6 is a block diagram of an example of the vertical color signal non-correlative energy extracting circuit 29 shown in FIG. 2. This circuit 29 is composed of horizontal band-pass filters 55, 56, a subtracter 57 and an absolute value calculator 58. The output signal 101 from the A/D converter 12 is supplied to the horizontal band-pass filter 55 and the output signal 103 from the second 1-line delay circuit 14 is supplied to the horizontal band-pass filter 56. The output of the horizontal band-pass filter 55 is supplied to one input terminal of the subtracter 57, while the output of the horizontal band-pass filter 56 is supplied to the other input terminal of the subtracter 57. The output of the subtracter 57 is supplied to the absolute value calculator 58 and the output of the absolute value calculator 58 constitutes the output DCV of the vertical color signal non-correlative energy extracting circuit 29.

Figure 7:
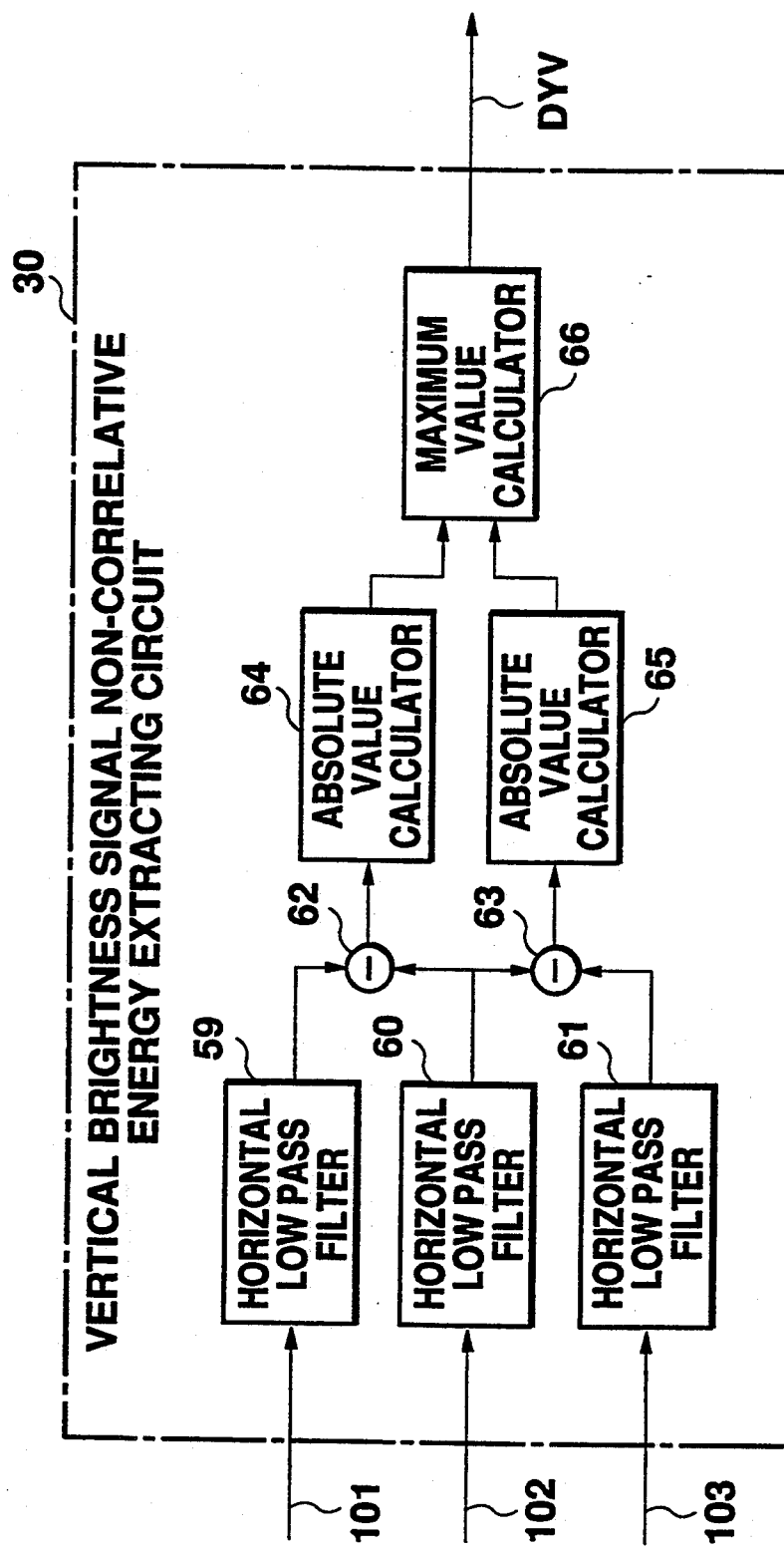
FIG. 7 is a block diagram of the structure of a vertical brightness signal non-correlative energy extracting circuit in the first embodiment.

FIG. 7 is a block diagram of an example of the vertical brightness signal non-correlative energy extracting circuit 30 shown in FIG. 2. This circuit 30 is composed of horizontal low pass filters 59, 60, 61, subtracters 62, 63, absolute value calculators 64, 65 and a maximum value calculator 66. The output signal 101 from the A/D converter 12 is supplied to the horizontal low pass filter 59, the output signal 102 from the first 1-line delay circuit 13 is supplied to the horizontal low pass filter 60, and the output signal 103 from the second 1-line delay circuit 14 is supplied to the horizontal low pass filter 61.

The output of the horizontal low pass filter 59 is supplied to one input terminal of the subtracter 62, and the output of the horizontal low pass filter 60 is supplied to the other input terminal of the subtracter 62 and one input terminal of the subtracter 63. The output of the horizontal low pass filter 61 is supplied to other input terminal of the subtracter 63. The output of the subtracter 62 is supplied to the absolute value calculator 64 and the output of the subtracter 63 is supplied to the absolute value calculator 65. The outputs of the absolute value calculators 64, 65 are supplied to the maximum value calculator 66 and the output of the maximum value calculator 66 constitutes the output DYV of the vertical brightness signal non-correlative energy extracting circuit 30.

The operation of the first embodiment shown in FIGS. 1 to 7 will now be explained.

When the composite color TV signal of an NTSC system is supplied to the A/D converter 12 through the input terminal 11, the A/D converter 12 samples the composite color TV signal at a sampling frequency of $f_s = 4f_{sc}$.

The sampled composite color TV signal passes through the first 1-line delay circuit 13 and the second 1-line delay circuit 14, whereby the sample value at a certain object sampling point and the sampling values at two reference sampling points which are one line above and below the object sampling point are simultaneously extracted.

Figure 13:
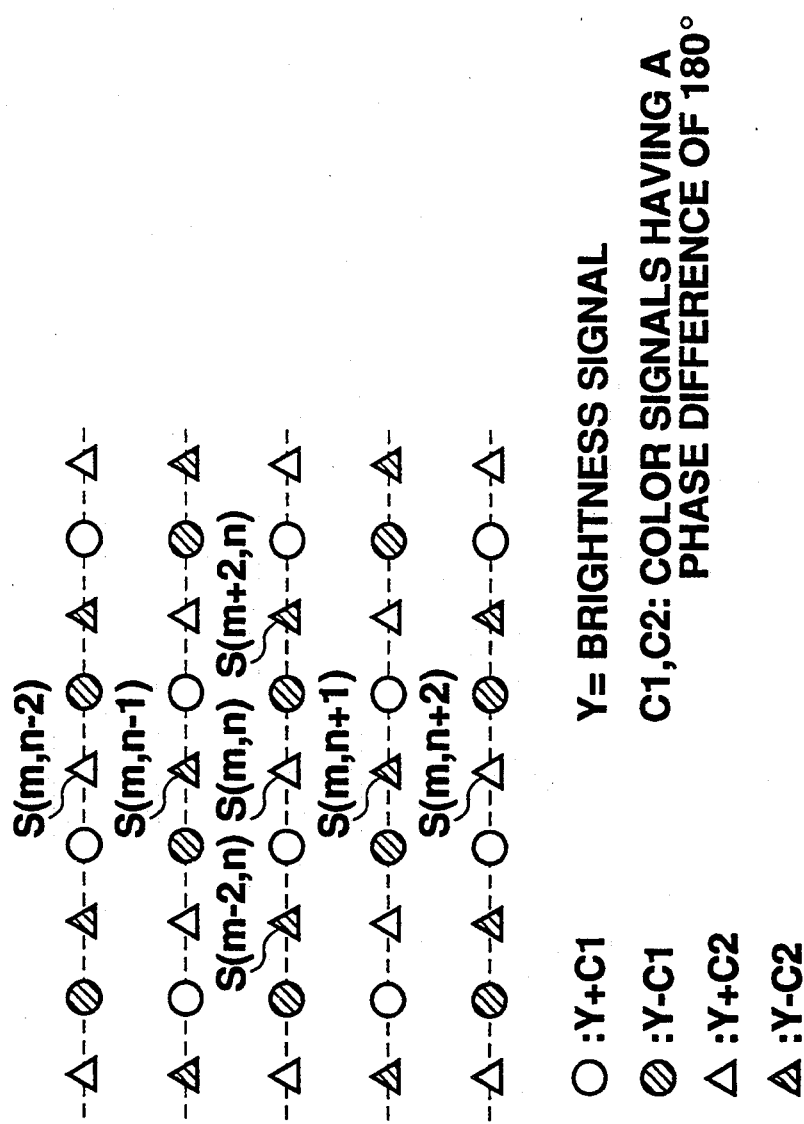
FIG. 13 shows the relationship between the sampled values of an NTSC system.

That is, when the composite color TV signal (sampled value) S(m, n) at the coordinates (m. n) is output as the output 102 of the first 1-line delay circuit 13, the signal S(m, n−1) and the signal S(m, n+1) are simultaneously output as the outputs 103, 101 of the second 1-line delay circuit 14 and the A/D converter 12, respectively (see FIG. 13).

The signal 102 is supplied to the horizontal color signal extracting filter 19, and the signals 102, 101, 103 are supplied to the inputs of the vertical color signal extracting filter 16, the horizontal/vertical color signal extracting filter 17 and the video correlation judging circuit 18, respectively.

For example, the transfer function of the vertical color signal extracting filter 16 at this time is represented by $$Cv(z) = (-\tfrac{1}{2})(1-Z^{-1})^2,$$

the transfer function of the horizontal color signal extracting filter 19 is represented by $$Ch(Z) = (-\tfrac{1}{2})(1-Z^{-2})^2,$$

and the transfer function of the horizontal/vertical color signal extracting filter 17 is represented by $$ChV(Z) = (-\tfrac{1}{2})(1-Z^{-2})^2 \cdot (-\tfrac{1}{2})(1-Z^{-1})^2.$$

The output signal 104 from the vertical color signal extracting filter 16 and the output signal 106 from the horizontal color signal extracting filter 19 and the output signal 108 from the horizontal/vertical color signal extracting filter 17 are supplied to the switching circuit 23 as the output signal 105 from the delay compensating circuit 20, the output signal 107 from the delay compensating circuit 22 and the output signal 109 from the delay compensating circuit 21, respectively.

The operation of selecting a color signal from the color signals of the vertical color signal extracting filter 16, the horizontal color signal extracting filter 19 and the horizontal/vertical color signal extracting filter 17 by the switching circuit 23 will now be explained.

The switching circuit 23 is operated as follows.

(1) When the correlation in the vertical direction at the object sampling point is especially high, the switching circuit 23 selects the output signal 105 from the delay compensating circuit 20 to which the output signal 104 is input from the vertical color signal extracting filter 16.

(2) When the correlation in the horizontal direction is especially high, the switching circuit 23 selects the output signal 107 from the delay compensating circuit 22 to which the output signal 106 is input from the horizontal color signal extracting filter 19.

(3) In the other cases, the switching circuit 23 selects the output signal 109 from the delay compensating circuit 21 to which the output signal 108 is input from the horizontal/vertical color signal extracting filter 17.

The video correlation judging circuit 18 detects the video correlation and controls the switching circuit 23 in the following manner.

If it is assumed that the horizontal color signal non-correlative energy is DCH(Z), the horizontal brightness signal non-correlative energy is DYH(Z), the vertical color signal non-correlative energy is DCV(Z), and the vertical brightness signal non-correlative energy is DYV(Z), these energies are represented by the ratio to the A/D converted composite color TV signal as follows:

$$DCH(Z) = |1-Z^{-4}|$$

$$DYH(Z) = \max(|(\tfrac{1}{2})\cdot(1+Z^{-1})^2\cdot(1-Z^{-2})|,$$
$$|(\tfrac{1}{2})\cdot(1+Z^{-1})^2\cdot(Z^{-2}-Z^{-4})|)$$

$$DCV(Z) = |(1-Z^{-2})^2\cdot(1-Z^{-2b})|$$

$$DYV(Z) = \max(|(\tfrac{1}{2})\cdot(1+Z^{-2})^2\cdot(1-Z^{-1})|,$$
$$|(\tfrac{1}{2})\cdot(1+Z^{-2})^2\cdot(Z^{-1}-Z^{-2b})|).$$

At this time, the first horizontal non-correlative energy DH1, the second horizontal non-correlative energy DH21, the third horizontal non-correlative energy DH22 and the vertical non-correlative energy DV are represented as follows:

DH1 = max (a·DYH, b·DCH)
DH21 = max (e1·DYH, f1·DCH)
DH22 = max (e2·DYH, f2·DCH)
DV = max (c·DYV, d·DCV)

The comparator 34 compares DH1 with n·DV. If DH1 ≥ n·DV, the comparator 34 judges that the video correlation in the vertical direction is high and the video correlation in the horizontal direction is low and outputs "1" as the signal 114 to the delay circuit 86. On the other hand, if DH1 < n·DV, the comparator 34 judges that the video correlation in the vertical direction is low and outputs "0" as the signal 114 to the delay circuit 86.

The comparator 35 compares DCV with m1·DH21. If DCV ≥ m1·DH21, the comparator 35 judges that the video correlation in the horizontal direction is high and that in the vertical direction is low and outputs "1" as the signal 115 to the delay circuit 87. On the other hand, if DCV < m1·DH21, the comparator 35 judges that the video correlation in the horizontal direction is low and outputs "0" as the signal 115 to the delay circuit 87.

The comparator 36 compares DYV with m2·DH22. If DYV ≥ m2·DH22, the comparator 36 judges that the video correlation in the horizontal direction is high and that in the vertical direction is low and outputs "1" as the signal 116 to the delay circuit 88. On the other hand, if DYV < m2·DH22, the comparator 36 judges that the video correlation in the horizontal direction is low and outputs "0" as the signal 116 to the delay circuit 88.

The signal 116 is delayed by the delay circuit 88 by $\tfrac{1}{2}f_{sc}$ and supplied to the delay circuit 89 as the signal 119, which is further delayed by $\tfrac{1}{2}f_{sc}$ by the delay circuit 89 and supplied to the AND circuit 90 as the signal 120. The signals 116 and 119 are also input to the AND circuit 90. The delay circuits 86, 87 and the AND circuit 90 supply the signals 117, 118 and 121, respectively, to the judging circuit 37.

The judging circuit 37 controls the switching circuit 23 in the following way on the basis of the results of the detection of the above correlations. The relationship between the input signals 117, 118, 121 and the output signal 110 and the color signals 105, 107, 109 which are selected by the switching circuit 23 is shown in Table 1.

TABLE 1

| | | | Output signal 110 of Judging circuit 37 | | |
|---|---|---|---|---|---|
| Output signal 117 of delay circuit 86 | Output signal 118 of delay circuit 87 | Output signal 121 of delay circuit 90 | Output signal 110a of AND circuit 38 | Output signal 110b of AND circuit 39 | Color signal signal 111 selected by switching circuit 23 |
| 0 | 0 | 0 | 1 | 0 | 109 |
| 0 | 0 | 1 | 0 | 0 | 107 |

TABLE 1-continued

| Output signal 117 of delay circuit 86 | Output signal 118 of delay circuit 87 | Output signal 121 of delay circuit 90 | Output signal 110 of Judging circuit 37 | | Color signal signal 111 selected by switching circuit 23 |
|---|---|---|---|---|---|
| | | | Output signal 110a of AND circuit 38 | Output signal 110b of AND circuit 39 | |
| 0 | 1 | 0 | 0 | 0 | 107 |
| 0 | 1 | 1 | 0 | 0 | 107 |
| 1 | 0 | 0 | 0 | 1 | 105 |
| 1 | 0 | 1 | 0 | 0 | 107 |
| 1 | 1 | 0 | 0 | 0 | 107 |
| 1 | 1 | 1 | 0 | 0 | 107 |

As is clear from Table 1, the switching circuit selects the output signal 107 from the delay compensating circuit 22 when both the output signal 110a from the AND circuit 38 and the output signal 110b from the AND circuit 39 are "0", selects the output signal 105 from the delay compensating circuit 20 when the output signal 110a from the AND circuit 38 is "0" and the output signal 110b from the AND circuit 39 is "1", and selects the output signal 109 from the delay compensating circuit 21 when the output signal 110a from the AND circuit 38 i s "1" and the output signal 110b from the AND circuit 39 is "0".

Therefore, the filter characteristic C(Z) of the color signal extracting filter in the embodiment shown in FIG. 1 is switched in the following manner in accordance with the degree of correlation.

When the video correlation in the horizontal direction is high, $$C(Z)=Ch(Z),$$

when the video correlation in the horizontal direction is low and that in the vertical direction is high, $$C(Z)=Cv(Z)$$

,
and when the video correlation in the horizontal direction is low and that in the vertical direction is low, $$C(Z)=Chv(Z).$$

Figure 8:
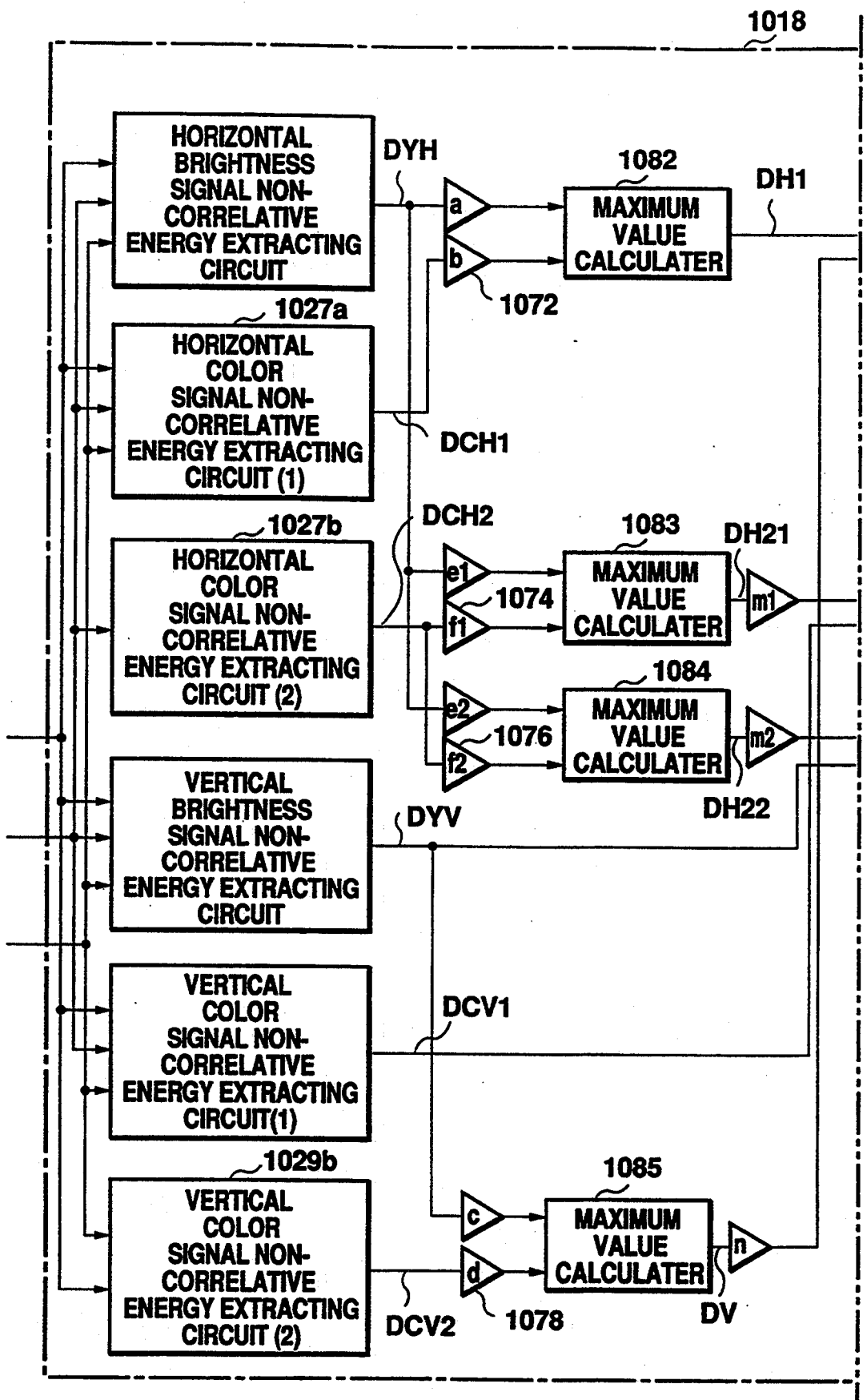
FIG. 8 is a block diagram of the structure of a video correlation judging circuit in a second embodiment of a brightness signal/color signal separating filter according to the present invention.
Figure 8:
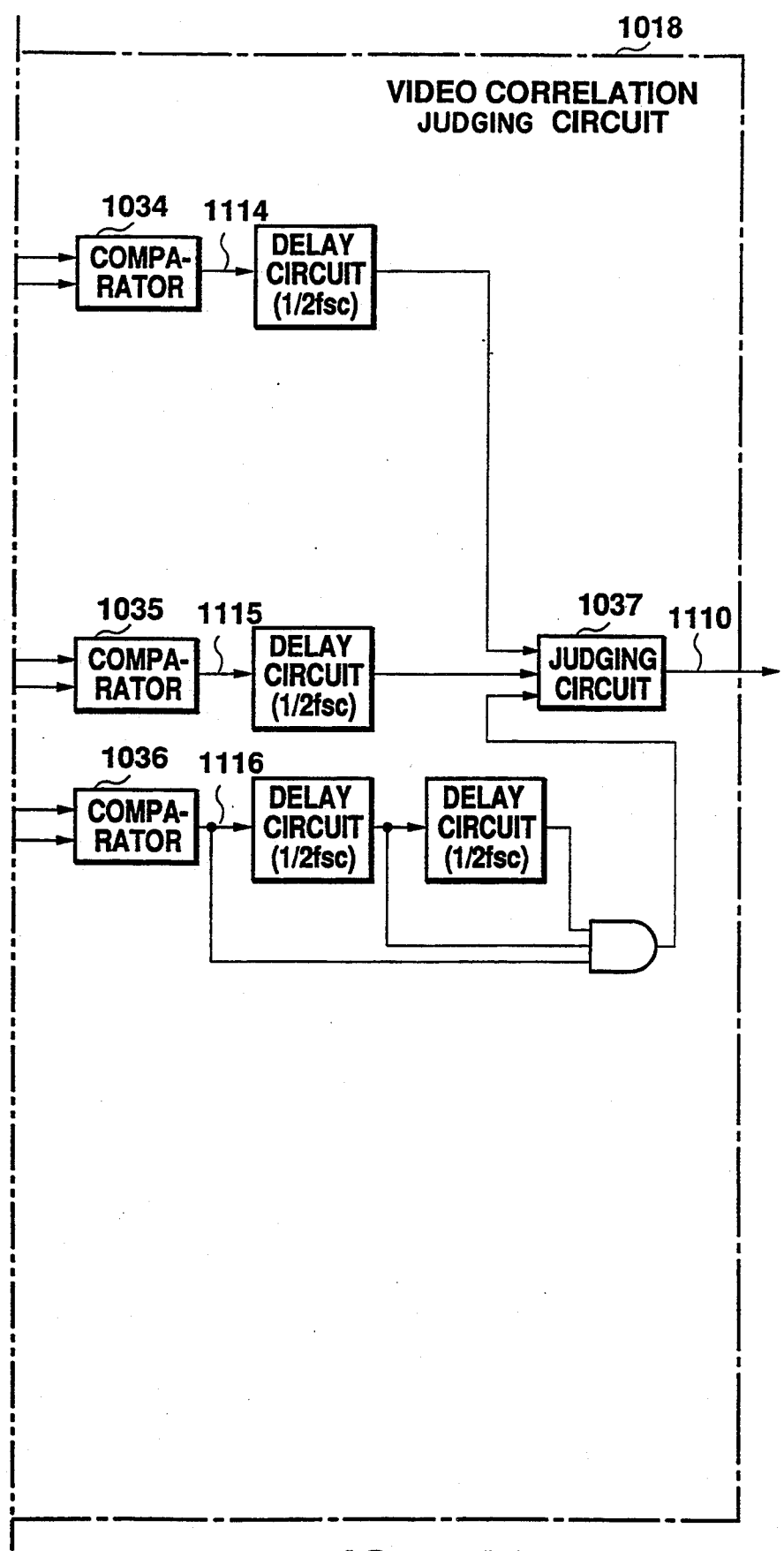

A seconal embodiment of the present invention will now be explained with reference to FIG. 8.

In the second embodiment, the video correlation judging circuit 18 shown in FIG. 2 is modified. In a video correlation judging circuit 1018 of this embodiment, the product b·DCH1 obtained by multiplying the output signal DCH1 of a first horizontal color signal non-correlative energy extracting circuit 1027a by the constant b by a multiplier 1072 and a·DYH are input to a maximum value calculator 1082. The maximum value calculator 1082 outputs DH1. The product f1·DCH2 obtained by multiplying the output signal DCH2 of a second horizontal color signal non-correlative energy extracting circuit 1027b by the constant f1 by a multiplier 1074 and e1·DYH are input to a maximum value calculator 1083. The maximum value calculator 1083 outputs DH 21. The product f2·DCH2 obtained by multiplying the output signal DCH2 by the constant f2 by a multiplier 1076 and e2·DYH are input to a maximum value calculator 1084. The maximum value calculator 1084 outputs DH 22. The product d·DCV2 obtained by multiplying the output signal DCV2 from a second vertical color signal non-correlative energy extracting circuit 1029b by the constant d by a multiplier 1078 and c·DYV are input to a maximum value calculator 1085. The maximum value calculator 1085 outputs DV. A comparator 1034 compares DH1 with n·DV, a comparator 1035 compares DCV1 wich m1·DH21 and a comparator 1036 compares DYV with m2·DH22.

The control of the selecting operation of a switching circuit by a judging circuit 1037 in accordance with the output 1110 of the judging circuit 1037 is the same as shown in Table 1.

In the first and second embodiments, the composite color TV signal is sampled at a frequency 4 times as high as the frequency of the color subcarrier which is synchronous with the horizontal scanning frequency. However, if a method of arranging sampling points in the form of a lattice on the screen is adopted, the sampling frequency is not restricted to 4 times the frequency-of the color subcarrier and may be another frequency.

The digital filter used in the above embodiments is only an example, and may be varied, for example, the number of stages at which filters are disposed may be increased.

Figure 11:
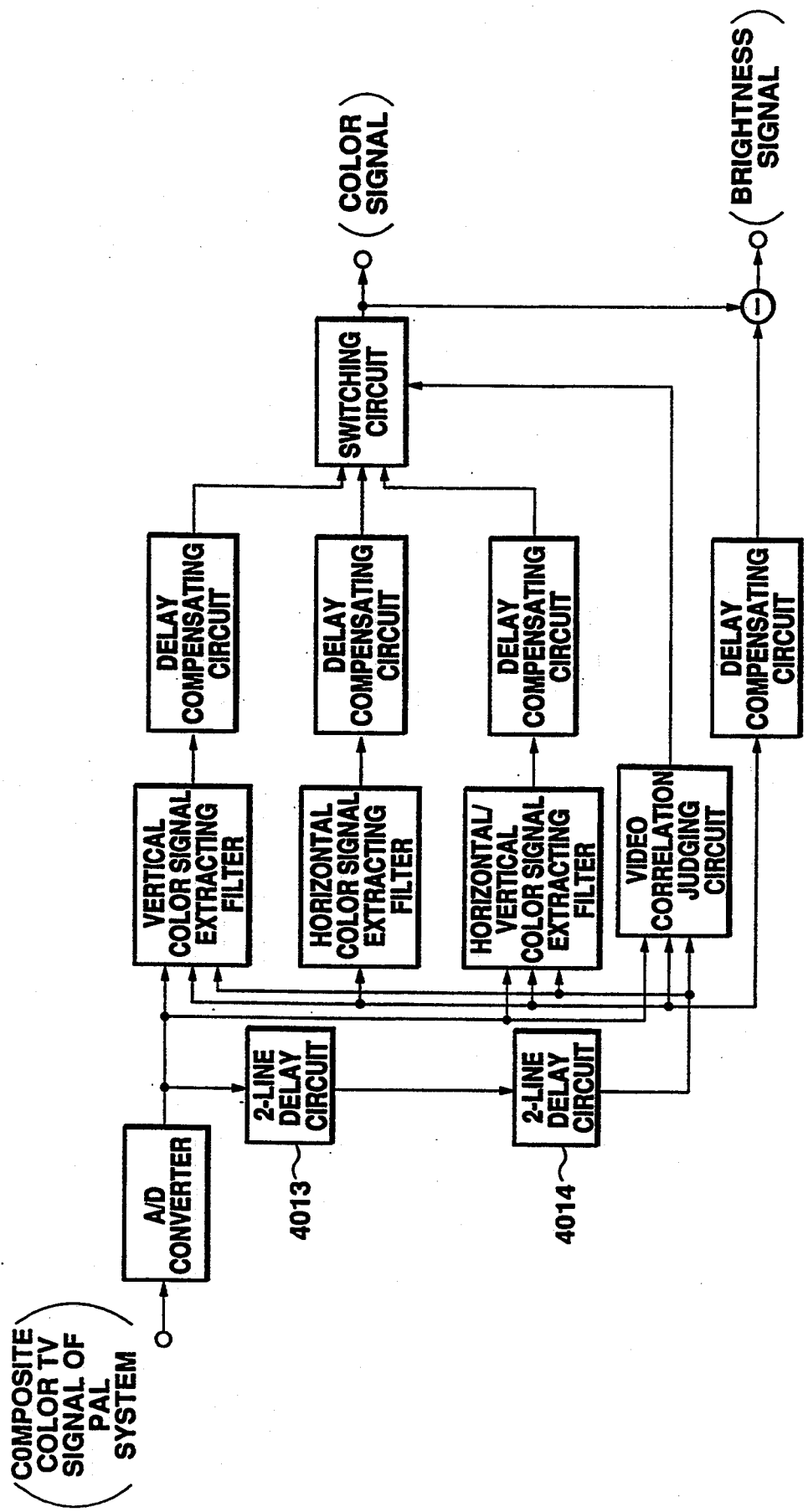
FIG. 11 is a block diagram of the structure of a video correlation judging circuit in a fifth embodiment of a brightness signal/color signal separating filter according to the present invention.
Figure 12:
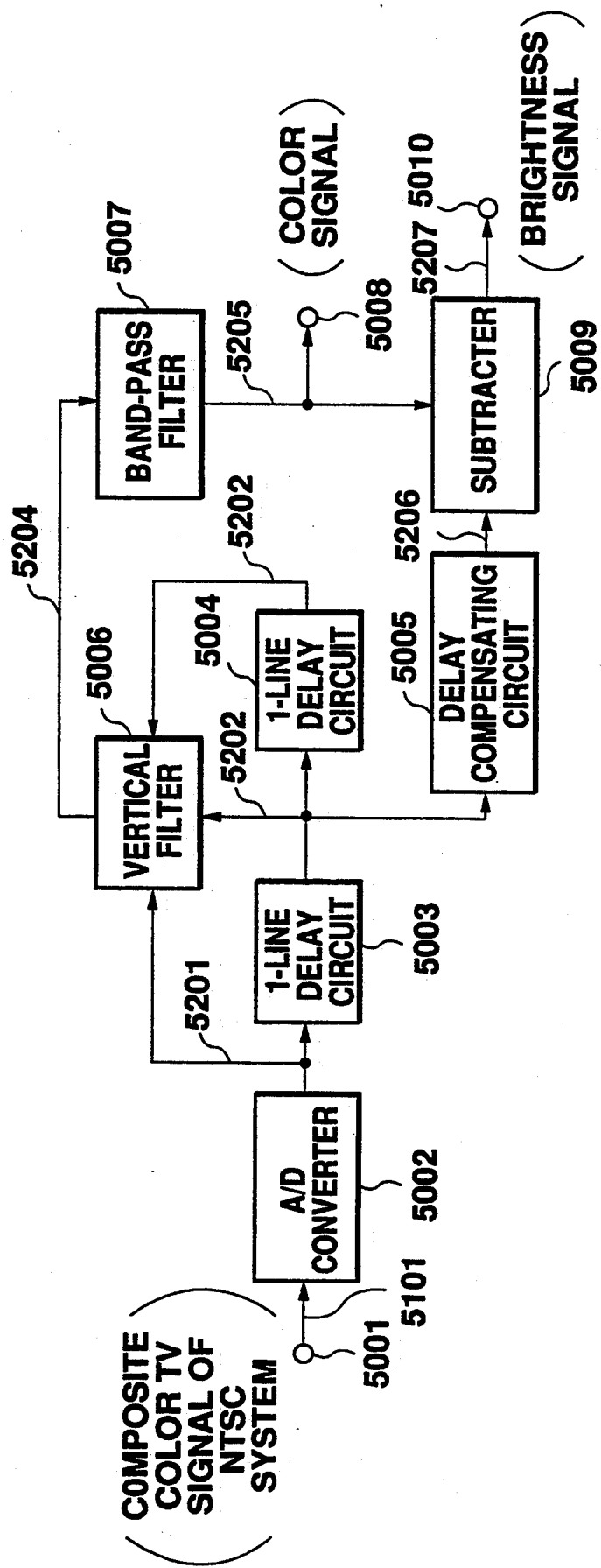
FIG. 12 is a block diagram of the structure of a conventional brightness signal/color signal separating filter.

Although these embodiments are applied to a composite color TV signal of an NTSC system, if 2-line delay circuits 4013, 4014 shown in FIG. 11 are used in place of the 1-line delay circuits 13, 14 in FIG. 1, these embodiments are applicable as a brightness signal/color signal separating filter for a composite color TV signal of a PAL system.

In the first and second embodiments, the signal 116 (1116) is passed through two delay circuits, but the number of delay circuit is not restricted to two so long as it is an even number so that non-correlation is detected over κ samples (κ: an integer) before and after the object pixel. In this case, the number of delay circuits through which the signals 114 (1114) and 115 (1115) are passed is not restricted to 1.

As described above, according to the first and second embodiments, the video correlations in the vertical direction and in the horizontal direction of a composite color TV signal are detected and, in the horizontal brightness component, the correlation is detected not only in the object pixel but also in the samples before and after the object pixel. The brightness signal/color signal separating filter outputs a signal selected from the output signals having different characteristics on the basis of the detected results. Thus, it is possible to provide a brightness/color signal separating filter which is capable of reducing the leakage of the brightness signal and the color signal into each other's channel and, hence, reducing the dot interference and which has a high resolution in the horizontal direction.

Figure 9:
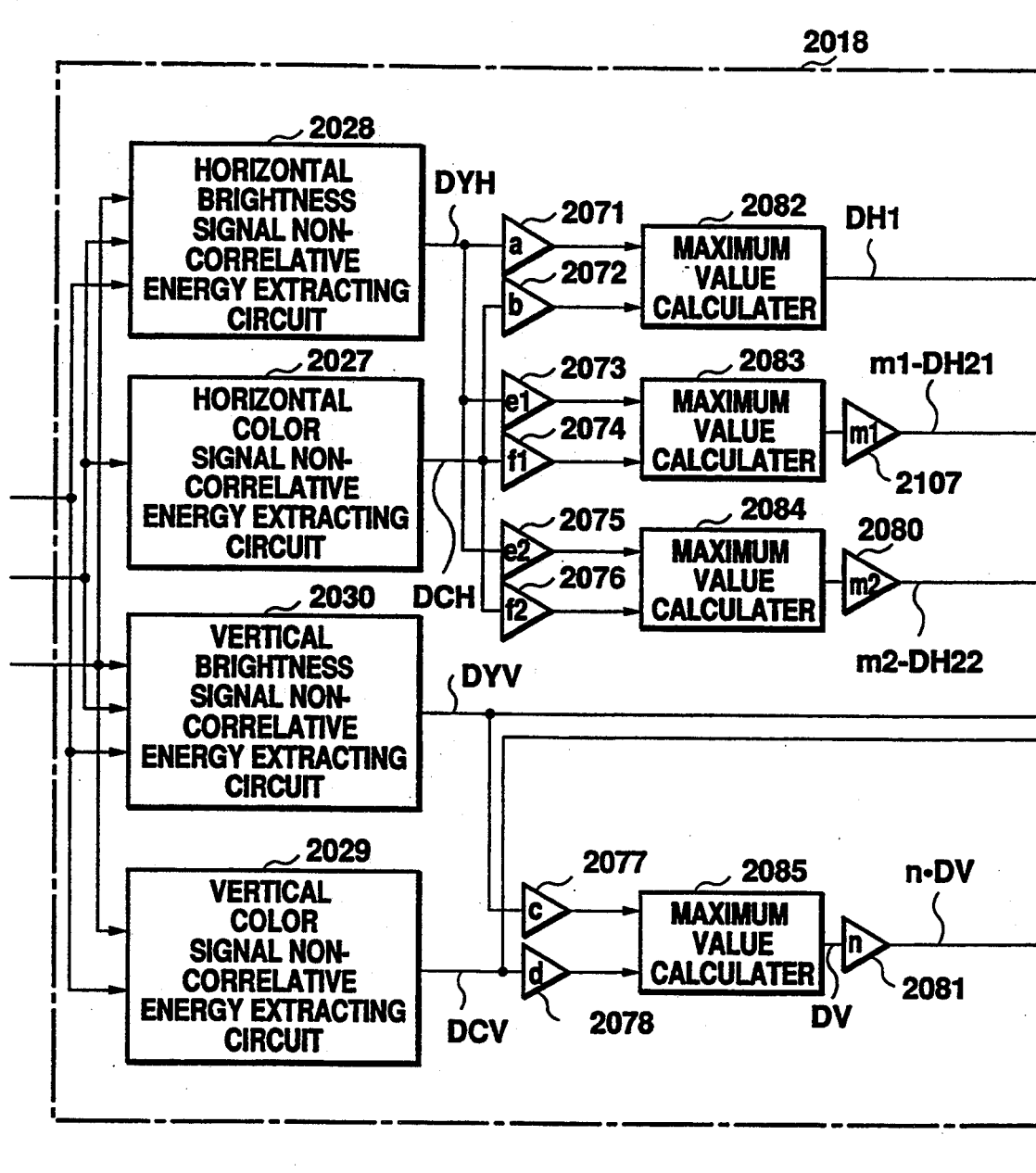
FIG. 9 is a block diagram of the structure of a video correlation judging circuit in a third embodiment of a brightness signal/color signal separating filter according to the present invention.
Figure 9:
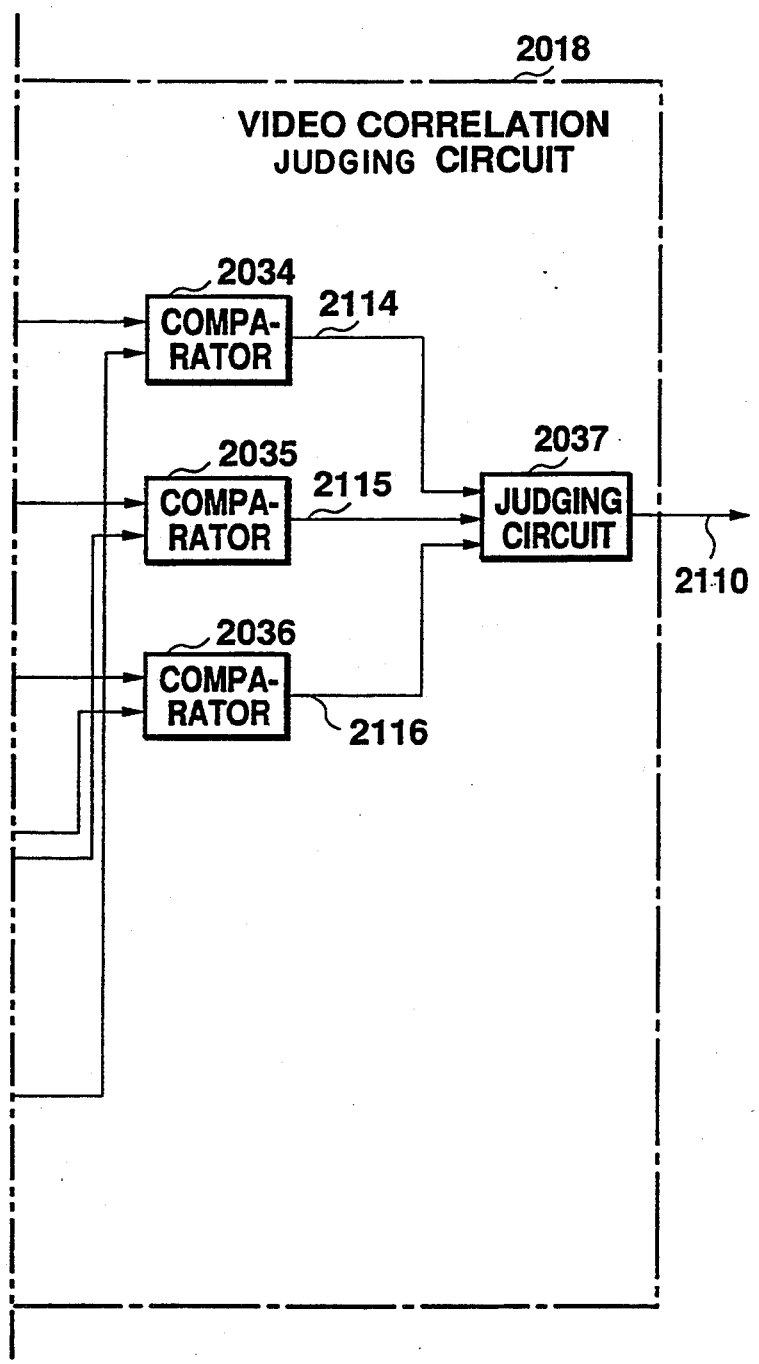

A third embodiment of the present invention will now be explained with reference to FIG. 9. In the third embodiment, the video correlation judging circuit 18 shown in FIG. 1 is again modified. FIG. 9 is a block diagram of a video correlation judging circuit 2018 of this embodiment. This circuit 2018 is composed of a horizontal color signal non-correlative energy extracting circuit 2027, a horizontal brightness signal non-correlative energy extracting circuit 2028, a vertical color signal non-correlative energy extracting circuit 2029, a vertical brightness signal non-correlative energy extracting circuit 2030, comparators 2034 to 2036, a judging circuit 2037, multipliers 2071 to 2081 and maximum value calculators 2082 to 2085.

The third embodiment is different from the first embodiment in that the outputs of the comparators 2034 to 2036 are directly supplied to the judging circuit 2037.

The third embodiment also produces a similar effect to that of the first embodiment except for the effect produced by comparing the degree of horizontal correlation using a plurality of signals sequentially being transferred with delay.

Figure 10:
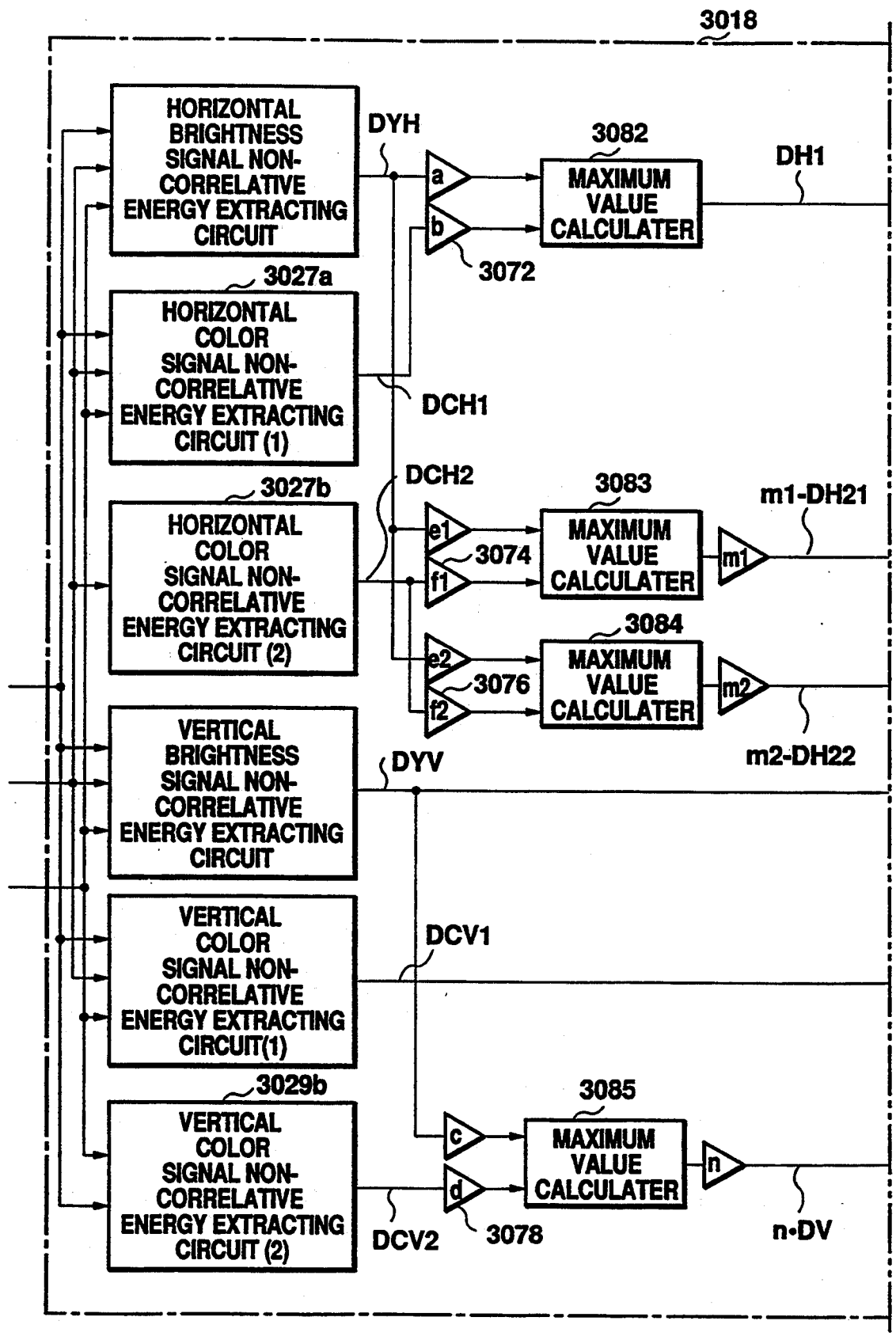
FIG. 10 is a block diagram of the structure of a video correlation judging circuit in a fourth embodiment of a brightness signal/color signal separating filter according to the present invention.
Figure 10:
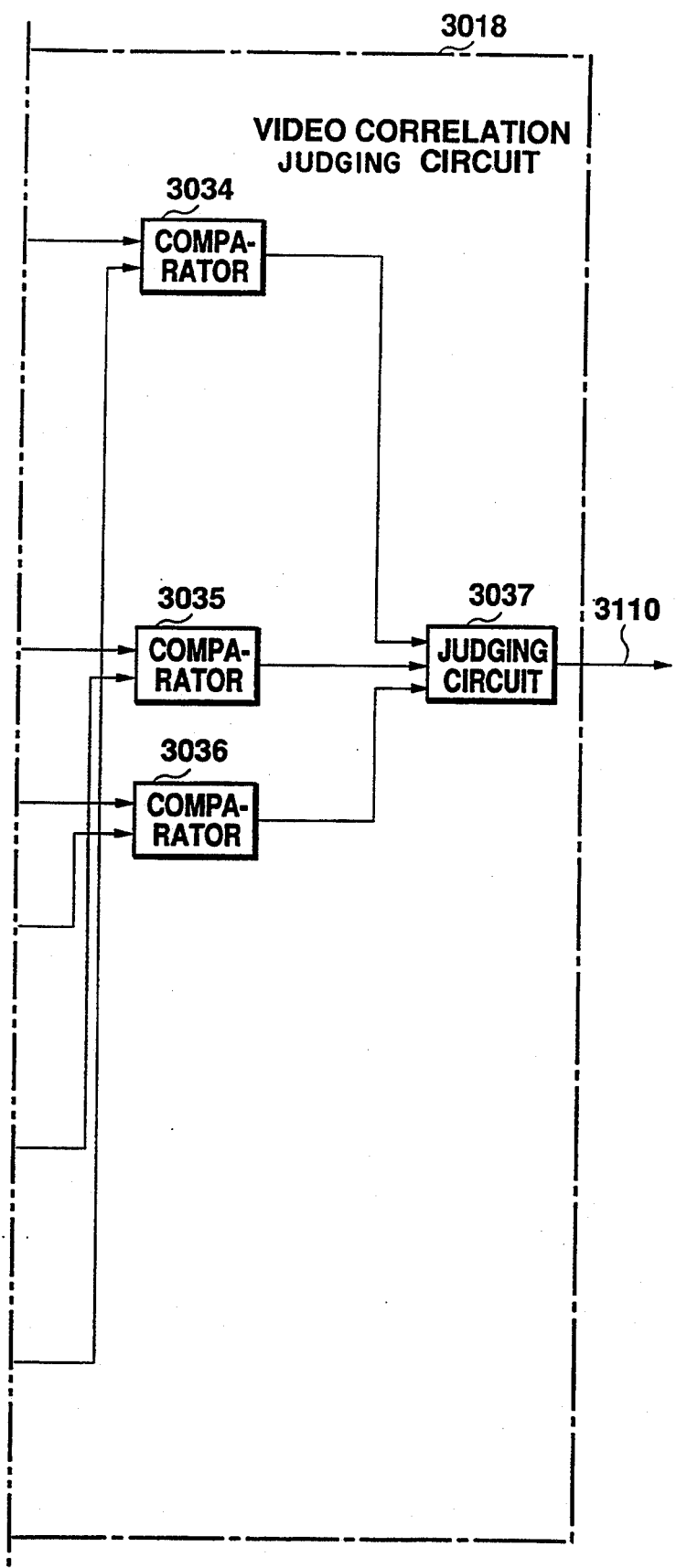

A fourth embodiment of the present invention will now be explained with reference to FIG. 10. This embodiment is a modification of the third embodiment shown in FIG. 9. FIG. 10 is a block diagram of a video correlation judging circuit of this embodiment. In a video correlation judging circuit 3018 of this embodiment, the product b·DCH1 obtained by multiplying the output signal DCH1 of a first horizontal color signal non-correlative energy extracting circuit 3027a by the constant b by a multiplier 3072 and a·DYH are input to a maximum value calculator 3082. The maximum value calculator 3082 outputs DH1. The product f1·DCH2 obtained by multiplying the output signal DCH2 of a second horizontal color signal non-correlative energy extracting circuit 3027b by the constant f1 by a multiplier 3074 and e1·DYH are input to a maximum value calculator 3083. The maximum value calculator 3083 outputs DH 21. The product f2·DCH2 obtained by multiplying the output signal DCH2 by the constant f2 by a multiplier 3076 and e2·DYH are input to a maximum value calculator 3084. The maximum value calculator 3084 outputs DH 22. The product d·DCV2 obtained by multiplying the output signal DCV2 from a second vertical color signal non-correlative energy extracting circuit 3029b by the constant d by a multiplier 3078 and c·DYV are input to a maximum value calculator 3085. The maximum value calculator 3085. outputs DV. A comparator 3034 compares DH1 with n·DV, comparator 3035 compares DCV1 with m1·DH21 and a comparator 3036 compares DYV with m2·DH22.

The control of the selecting operation of a switching circuit by a judging circuit 3037 in accordance with the output 3110 of the judging circuit 3037 is the same as shown in Table 1.

As described above, according to the third and fourth embodiments, the video correlations in the vertical direction and in the horizontal direction of a composite color TV signal are detected, and the brightness signal/color signal separating filter outputs a signal selected from the input signals having different characteristics on the basis of the detected results. Thus, it is possible to provide a brightness/color signal separating filter which is capable of reducing the leakage of the brightness signal and the color signal into each other's channel and, hence, reducing the dot interference.

Although these embodiments are applied to a composite color TV signal of an NTSC system, if 2-line delay circuits 4013, 4014 shown in FIG. 11 are used in place of the 1-line delay circuits, these embodiments are applicable as a brightness signal/color signal separating filter for a composite color TV signal of a PAL system.

While there has been described what are at present considered to be a preferred embodiment of the invention, it will be understood that various modifications may be made thereto, and it is intended that the appended claims cover all such modifications as fall within the true spirit and scope of the invention.

What is claimed is:

1. A brightness signal/color signal separating filter comprising:

delay means for delaying a composite video signal which is sampled at a frequency synchronous with a horizontal scanning frequency and extracting sample values at an object sampling point and at least two reference sampling points;

extracting filter means for extracting and outputting at least first and second signals based on the sample values, said first signal including color subcarrier frequency components in a first direction, said second signal including color subcarrier frequency components in a second direction, said first and second directions being non-parallel;

selection means for selecting one of at least said first signal and said second signal as a separated color signal in accordance with a selection signal;

video correlation judging means for outputting said selection signal to control said selecting means;

brightness extraction means using said separated color signal and output of said delay means to produce a separated brightness signal; and wherein said video correlation judging means includes, horizontal brightness signal non-correlative energy extracting means for extracting, based on said sample values, a horizontal brightness signal non-correlative energy which indicates the degree of non-correlativity of a brightness signal in a horizontal scanning direction;

horizontal color signal non-correlative energy extracting means for extracting, based on said sample values, at least one horizontal color signal non-correlative energy which indicates the degree of non-correlativity of a color signal in the horizontal scanning direction;

vertical brightness signal non-correlative energy extracting means for extracting, based on said sample values, a vertical brightness signal non-correlative energy which indicates the degree of non-correlativity of the brightness signal in a vertical scanning direction;

vertical color signal non-correlative energy extracting means for extracting, based on said sample values, at least one vertical color signal non-correlative energy which indicates the degree of non-correlativity of the color signal in the vertical scanning direction;

first generating means for generating at least one first vertical quasi-comparative signal for judging that vertical non-correlation is at least a predetermined degree greater than horizontal non-correlation from said horizontal brightness signal non-correlative energy, said horizontal color signal non-correlative energy, and one of said vertical brightness signal non-correlative energy and said vertical color signal non-correlative energy;

second generating means for generating an intermediate quasi-comparative signal from said horizontal brightness signal non-correlative energy, said horizontal color signal non-correlative energy and said vertical brightness signal non-correlative energy, said second generating means generating at least one delayed intermediate quasi-comparative signal, and generating at least one second vertical quasi-comparative signal for judging that the vertical non-correlation is at least the predetermined degree greater than the horizontal non-correlation when said intermediate quasi-comparative signal and said delayed intermediate quasi-comparative signal are coincident, at least one of said intermediate quasi-comparative signal and said delayed intermediate quasi-comparative signal representing said object sample point; and judging means for generating said selection signal to select one of at least said first and second signal based on said first vertical quasi-comparative signal and said second vertical quasi-comparative signal.

2. The brightness signal/color signal separating filter of claim 1, wherein said delay means includes, first delay means for delaying said composite video signal by a predetermined number of lines and outputting the delayed signal as a first delayed composite video signal, and second delay means for delaying said first delayed composite video signal by the same number of lines as said first delay means and outputting the delayed signal as a second delayed composite video signal; and said extracting filter means includes, horizontal color signal extracting filter means for extracting said first signal including a color subcarrier frequency component in the horizontal scanning direction on the basis of three sampled values in the horizontal scanning direction and outputting the extracted signal as the first signal, said three sampled values in the horizontal scanning direction being the sample value at said object sampling point, the sample value at a first reference sampling point and the sample value at a second reference sampling point, said first reference sampling point being one of a plurality of sampling points which constitute said first delayed composite video signal and being situated a predetermined number of sampling points to the left of said object sampling point on a screen, and said second reference sampling point being one of the plurality of sampling points which constitute said first delayed composite video signal and being situated said predetermined number of sampling points to the right of said object sampling point on the screen in bilateral symmetry with said first reference sampling point with respect to said object sampling point, and horizontal/vertical color signal extracting filter means for extracting said second signal including a color subcarrier frequency component in the vertical scanning direction and in the horizontal scanning direction on the basis of five sample values and outputting said second signal, said five sample values being the sample value at said object sampling point, the sample value at said first reference sampling point, the sample value at said second reference sampling point, a sample value at a third reference sampling point and a sample value at a fourth reference sampling point, said third reference sampling point being one of a plurality of sampling points which constitute said composite video signal and being situated said predetermined number of lines, which corresponds to the delay of said first delay means, above said object sampling point on the screen, and said fourth reference sampling point being one of a plurality of sampling points which constitute said second delayed composite video signal and being situated said predetermined number of lines, which corresponds to the delay of said second delay means, below said object sampling point on the screen.

3. The brightness signal/color signal separating filter of claim 1, wherein said first generating means comprises:

first multiplier means for multiplying said horizontal brightness signal non-correlative energy by a first constant;

second multiplier means for multiplying said horizontal color signal non-correlative energy by a second constant;

first maximum value calculator means for comparing the output of said first multiplier means with the output of said second multiplier means and outputting a larger value of the output of said first multiplier means and the output of said second multiplier means as a horizontal non-correlative energy;

third multiplier means for multiplying the output of said first maximum value calculator means by a third constant; and first comparator means for comparing said vertical color signal non-correlative energy with the output of said third multiplier means and judging that video correlation in the horizontal scanning direction is high and video correlation in the vertical scanning direction is low in the vicinity of said object sampling point when said vertical color signal non-correlative energy is larger and that said video correlation in the horizontal scanning direction is low in the vicinity of said object sampling point when said output of said third multiplier means is larger.

4. The brightness signal/color signal separating filter of claim 1, wherein said second generating means comprises:

first multiplier means for multiplying said horizontal brightness signal non-correlative energy by a first constant;

second multiplier means for multiplying said horizontal color signal non-correlative energy by a second constant;

maximum value calculator means for comparing the output of said first multiplier means with the output of said second multiplier means and outputting a larger value of the output of said first multiplier means and the output of said second multiplier means as a horizontal non-correlative energy;

third multiplier means for multiplying the output of said maximum value calculator means by a third constant; and comparator means for comparing said vertical brightness signal non-correlative energy with the output of said third multiplier means and judging that video correlation in the horizontal scanning direction is high and video correlation in the vertical scanning direction is low in the vicinity of said object sampling point when said vertical brightness signal non-correlative energy is larger and judging that said video correlation in the horizontal scanning direction is low in the vicinity of said object sampling point when said output of said third multiplier means is larger.

5. The brightness signal/color signal separating filter of claim 4, wherein said second generating means further comprises:

first delay means delaying output of said comparator means by one-half a subcarrier frequency;

second delay means delaying output of said first delay means by one-half the subcarrier frequency; and logical AND means inputting said output of said comparator means, said output of said first delay means and output of said second delay means.

6. The brightness signal/color signal separating filter of claim 3, wherein said second generating means comprises:

fourth multiplier means for multiplying said horizontal brightness signal non-correlative energy by a fourth constant;

fifth multiplier means for multiplying said horizontal color signal non-correlative energy by a fifth constant;

second maximum value calculator means for comparing the output of said fourth multiplier means with the output of said fifth multiplier means and outputting the larger value as the horizontal non-correlative energy;

sixth multiplier means for multiplying the output of said second maximum value calculator means by a sixth constant; and second comparator means for comparing said vertical brightness signal non-correlative energy with the output of said sixth multiplier means and judging that said video correlation in the horizontal scanning direction is high and said video correlation in the vertical scanning direction is low in the vicinity of said object sampling point when said vertical brightness signal non-correlative energy is larger and judging that said video correlation in the horizontal scanning direction is low in the vicinity of said object sampling point when said output of said sixth multiplier means is larger.

7. The brightness signal/color signal separating filter of claim 2, wherein said judging means generates said selection signal to select said second signal when both said first and second vertical quasi-comparative signals indicate that the vertical non-correlation is not at least the predetermined degree greater than the horizontal non-correlation, otherwise, said judging means generates said selection signal to select said first signal.

8. The brightness signal/color signal separating filter of claim 6, wherein said judging means generates said selection signal to select said second signal when both said first and second vertical quasi-comparative signals indicate that said video correlation in the horizontal scanning direction is low in the vicinity of said object sampling point, otherwise, said judging means generates said selection signal to select said first signal.

* * * * *